US010800374B2

(12) United States Patent
Szente et al.

(10) Patent No.: US 10,800,374 B2
(45) Date of Patent: Oct. 13, 2020

(54) RELATIVE DISPLACEMENT MECHANISM FOR ACTIVE PEDESTRIAN SAFETY LATCH

(71) Applicant: MAGNA CLOSURES INC., Newmarket (CA)

(72) Inventors: Csaba Szente, Newmarket (CA); John Distefano, Richmond Hill (CA); Ioan Dorin Ilea, Vaughan (CA)

(*) Notice: Subject to any disclaimer, the term of this patent is extended or adjusted under 35 U.S.C. 154(b) by 134 days.

(21) Appl. No.: 16/197,736

(22) Filed: Nov. 21, 2018

(65) Prior Publication Data

US 2019/0152426 A1 May 23, 2019

Related U.S. Application Data

(60) Provisional application No. 62/589,229, filed on Nov. 21, 2017.

(51) Int. Cl.
 *B60R 21/38* (2011.01)
 *E05B 77/08* (2014.01)
 (Continued)

(52) U.S. Cl.
 CPC ............ *B60R 21/38* (2013.01); *E05B 51/023* (2013.01); *E05B 77/08* (2013.01); *E05B 81/16* (2013.01);
 (Continued)

(58) Field of Classification Search
 CPC ... B60R 21/38; B60R 21/34; B60R 2021/343; E05B 51/023; E05B 77/08; E05B 81/16; E05B 85/00; E05B 83/24; E05Y 2900/536
 See application file for complete search history.

(56) References Cited

U.S. PATENT DOCUMENTS 6,415,882 B1 * 7/2002 Schuster ................ B60R 21/38
 16/223
7,296,325 B1 * 11/2007 Putumbaka ............... E05D 3/02
 16/348
(Continued)

*Primary Examiner* — Drew J Brown

(57) ABSTRACT

A latch assembly for providing travel of a closure panel of a vehicle away from a latch during a collision event, the latch assembly compromising: a mounting plate of the latch for mounting a set of latch components thereon including a ratchet coupled to a pawl for retaining and releasing a mating latch component with respect to a slot of the latch, the mating latch component mounted to the closure panel, the latch components further including a secondary catch, the mounting plate connected to a body of the vehicle; a support plate coupled to the mounting plate by a support connector, the support connector providing a sliding connection between the support plate and the mounting plate along an axis; a blocking member mounted to one of the support plate and the mounting plate, such that engagement of the blocking member limits relative displacement between the support plate and the mounting plate along the axis; an actuation system mounted on the support plate, the actuation system for moving by the travel the closure panel between a primary latched position and a secondary latched position during actuation of the actuation system; wherein disengagement of the blocking member subsequent to the actuation of the actuation system provides for the relative displacement between the support plate and the mounting plate along the axis opposite to the direction of the travel of the closure panel.

20 Claims, 22 Drawing Sheets

(51) Int. Cl.
    *E05B 83/24*          (2014.01)
    *E05B 81/16*          (2014.01)
    *E05B 51/02*          (2006.01)

(52) U.S. Cl.
    CPC ......... *E05B 83/24* (2013.01); *E05Y 2900/536* (2013.01)

(56) References Cited

U.S. PATENT DOCUMENTS

| | | | |
|---|---|---|---|
| 2005/0279550 A1* | 12/2005 | Saville | B60R 21/38 180/69.21 |
| 2007/0246281 A1* | 10/2007 | Parks | B60R 21/38 180/69.2 |
| 2009/0289474 A1* | 11/2009 | Kim | B60R 21/38 296/193.11 |
| 2013/0033069 A1* | 2/2013 | Hwang | B60R 21/38 296/187.04 |
| 2013/0087401 A1* | 4/2013 | Masih | E05B 17/0062 180/274 |
| 2020/0157859 A1* | 5/2020 | Szente | E05B 83/24 |

* cited by examiner

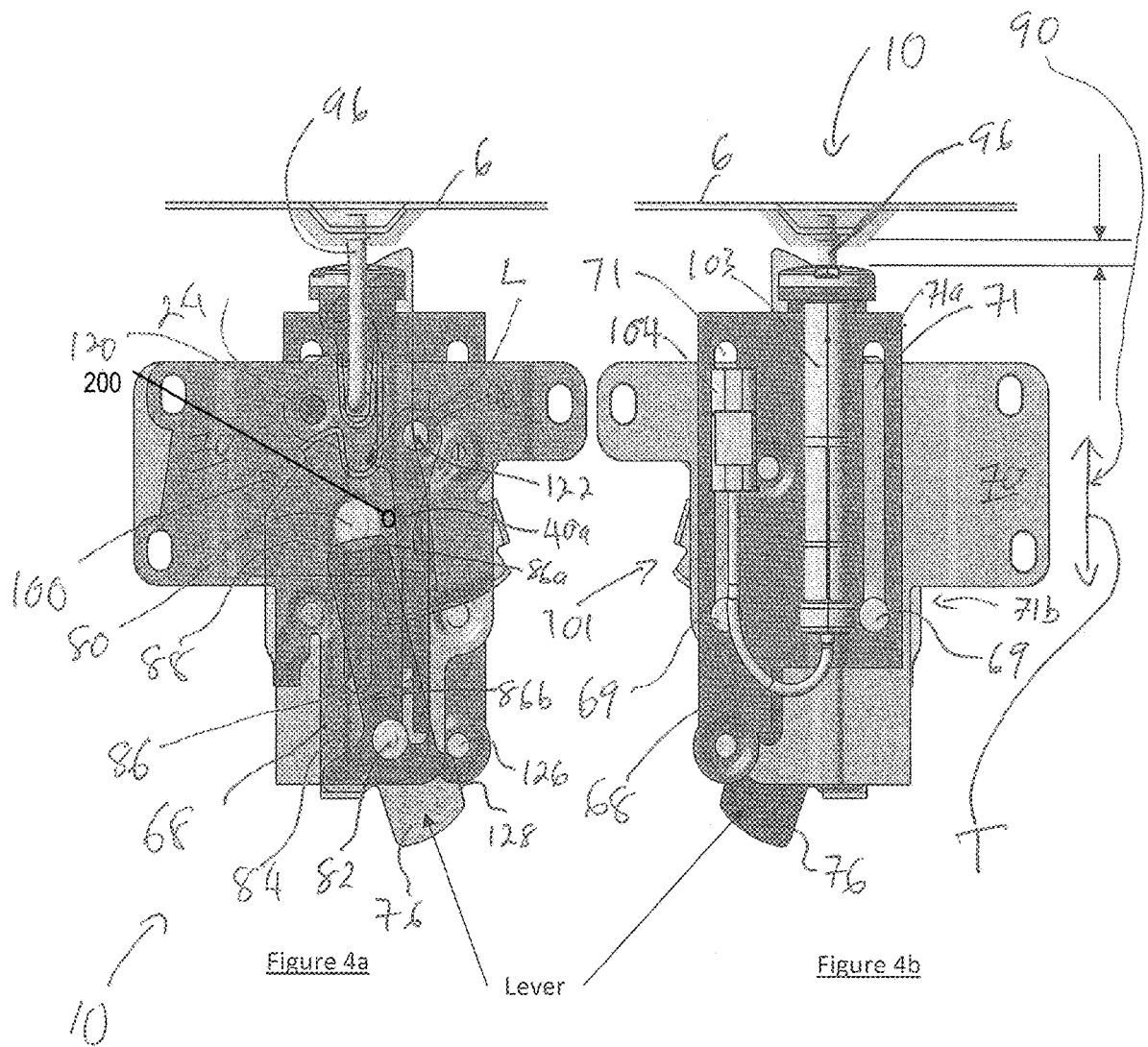

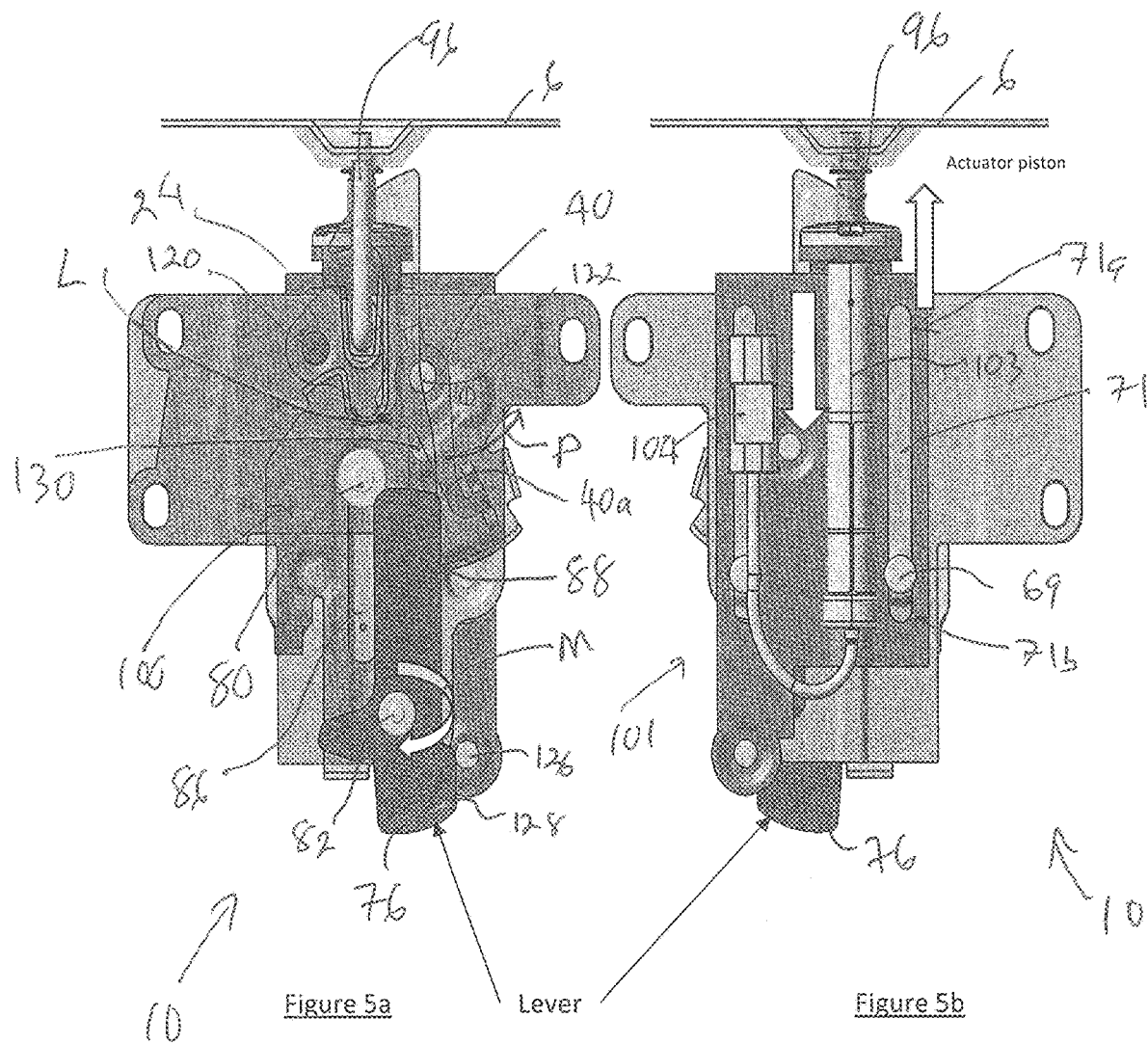
Figure 5a     Lever     Figure 5b

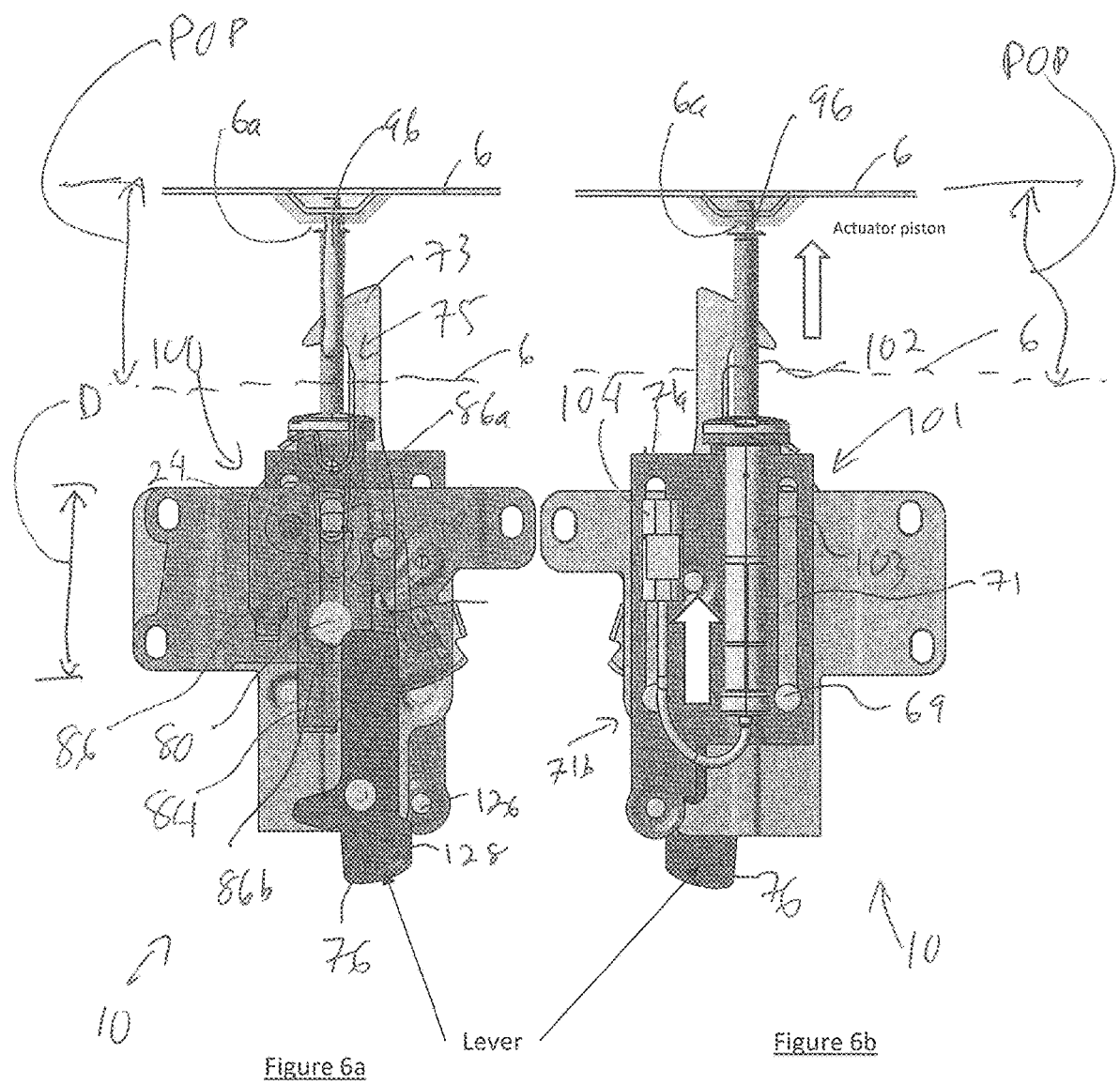

RELATIVE DISPLACEMENT MECHANISM FOR ACTIVE PEDESTRIAN SAFETY LATCH

CROSS-REFERENCE TO RELATED APPLICATIONS

This application claims priority from U.S. Provisional Patent Application No. 62/589,229, filed on Nov. 21, 2017; the entire contents of which are hereby incorporated by reference herein.

FIELD

This disclosure relates to vehicle safety systems.

BACKGROUND

The automotive industry is attempting to better protect pedestrians from head on collisions with vehicles. When a car hits a pedestrian in a front end collision, the pedestrian can be thrown up and land on the front hood of the vehicle and/or the windshield. In an effort to ameliorate the harshness of the impact, and in particular to prevent the person's head from hitting the engine block or other hard point located directly underneath the front hood, it is desired to actively space the front hood from the engine block whenever a front end collision is detected. In particular, when a front end collision is detected by crash sensors, it is desired to move the front hood in a very short period of time (e.g., in milliseconds) from a first aerodynamic position where the front hood is normally located very close to the engine block to a second position where the front hood is actively moved further away from the engine block. This activity could provide the pedestrian's head and/or torso with sufficient time and/or space to decelerate when the pedestrian impacts the front hood and thus prevent fatal injury.

Other problems in industry related to safety systems is actuation speed and/or actuation distance of safety devices (e.g. device response time) tempered with actuation power requirements, including the ability for the vehicle systems to return to normal operation after deployment of the safety systems. A further problem in industry is the need for reduced cost of safety systems, including modular components to facilitate replacement a reduction in replacement costs.

SUMMARY

It is an object to the present invention to provide a component of a safety system to obviate or mitigate at least one of the above-mentioned problems.

An aspect provided is a latch assembly for providing travel of a closure panel of a vehicle away from a latch during a collision event, the latch assembly compromising: a mounting plate of the latch for mounting a set of latch components thereon including a ratchet coupled to a pawl for retaining and releasing a mating latch component with respect to a slot of the latch, the mating latch component mounted to the closure panel, the mounting plate connected to a body of the vehicle; a support plate coupled to the mounting plate by a support connector, the support connector providing a sliding connection between the support plate and the mounting plate along an axis; a blocking member mounted to one of the support plate and the mounting plate, such that engagement of the blocking member limits relative displacement between the support plate and the mounting plate along the axis; an actuation system mounted on the support plate, the actuation system for moving by the travel the closure panel between a primary latched position and a secondary latched position during actuation of the actuation system; wherein disengagement of the blocking member subsequent to the actuation of the actuation system provides for the relative displacement between the support plate and the mounting plate along the axis opposite to the direction of the travel of the closure panel.

In accordance with another aspect, the latch components further including a secondary catch.

The latch assembly wherein the blocking member is engaged with the pawl to provide the limits relative displacement.

The latch assembly wherein the blocking member is engaged with a coupling lever to provide the limits relative displacement.

The latch assembly having a coupling lever mounted to one of the support plate or the mounting plate in cooperation with a decoupling member mounted to the other of the support plate or the mounting plate, such that engagement between the decoupling member and the coupling lever provides for disengagement of the pawl from the ratchet to provide for the travel during the actuation.

The latch assembly, wherein the support plate moves in a direction opposite to said travel in a first stage of the actuation in order to disengage the pawl from the ratchet via a movement of the pawl.

The latch assembly, wherein the movement of the pawl during said first stage of said actuation engages the pawl with the blocking member in order to effect the limits of relative displacement.

The latch assembly further having a coupling lever mounted to one of the support plate or the mounting plate, such that movement of coupling lever during the first stage of the actuation engages the coupling lever with the blocking member in order to effect said limits relative displacement.

The latch assembly further having a coupling lever mounted to one of the support plate or the mounting plate in cooperation with a decoupling member mounted to the other of the support plate or the mounting plate, such that engagement between the decoupling member and the coupling lever provides for disengagement of the coupling lever from the secondary catch to provide for the travel of the catch connector during said actuation.

The latch assembly further having a coupling lever pivotally connected to one of the support plate or the mounting plate by a lever connector, the coupling lever pivoted about the lever connector via contact with a decoupling member mounted on the other of the support plate or the mounting plate.

The latch assembly, wherein the actuation causes the contact with the decoupling member and/or wherein the contact is a result of an initial relative displacement between the support plate and the mounting plate.

A further aspect provided is a method of operating a latch assembly for providing travel of a closure panel of a vehicle away from a latch during a collision event, latch moving between a primary latched position and a secondary latched position, latch assembly having a latch mounted on a mounting plate including a ratchet and a pawl for retaining in the primary latched position a mating latch component connected to the closure panel, the latch assembly also having an actuation system mounted on a support plate, the support plate coupled to the mounting plate, the method compromising the steps of: releasing the pawl from engagement with the ratchet when in the primary latched position; limiting relative displacement between the support plate and the mounting plate by engaging a blocking member there between; forcing the closure panel away from the latch by actuation of the actuation system in order to place the latch in the secondary latched position, the secondary latched position coinciding with a deployed position of the actuation system resulting in positioning of the closure panel away from the latch by the travel; disengaging the blocking member in order to provide the relative displacement; and moving the support plate by the relative displacement with respect to the mounting plate opposite to the direction of said travel in order to return the closure panel towards the latch.

BRIEF DESCRIPTION OF THE DRAWINGS

The foregoing and other aspects will be more readily appreciated having reference to the drawings, wherein:

FIGS. 4*a* to 4*d* show an initial position of the latch assembly of FIG. 3;

FIGS. 5*a* to 5*d* show an intermediate position of the latch assembly of FIG. 3;

FIGS. 6*a* to 6*d* show a deployed position of the latch assembly of FIG. 3;

DESCRIPTION OF THE PREFERRED EMBODIMENTS

Figure 1:
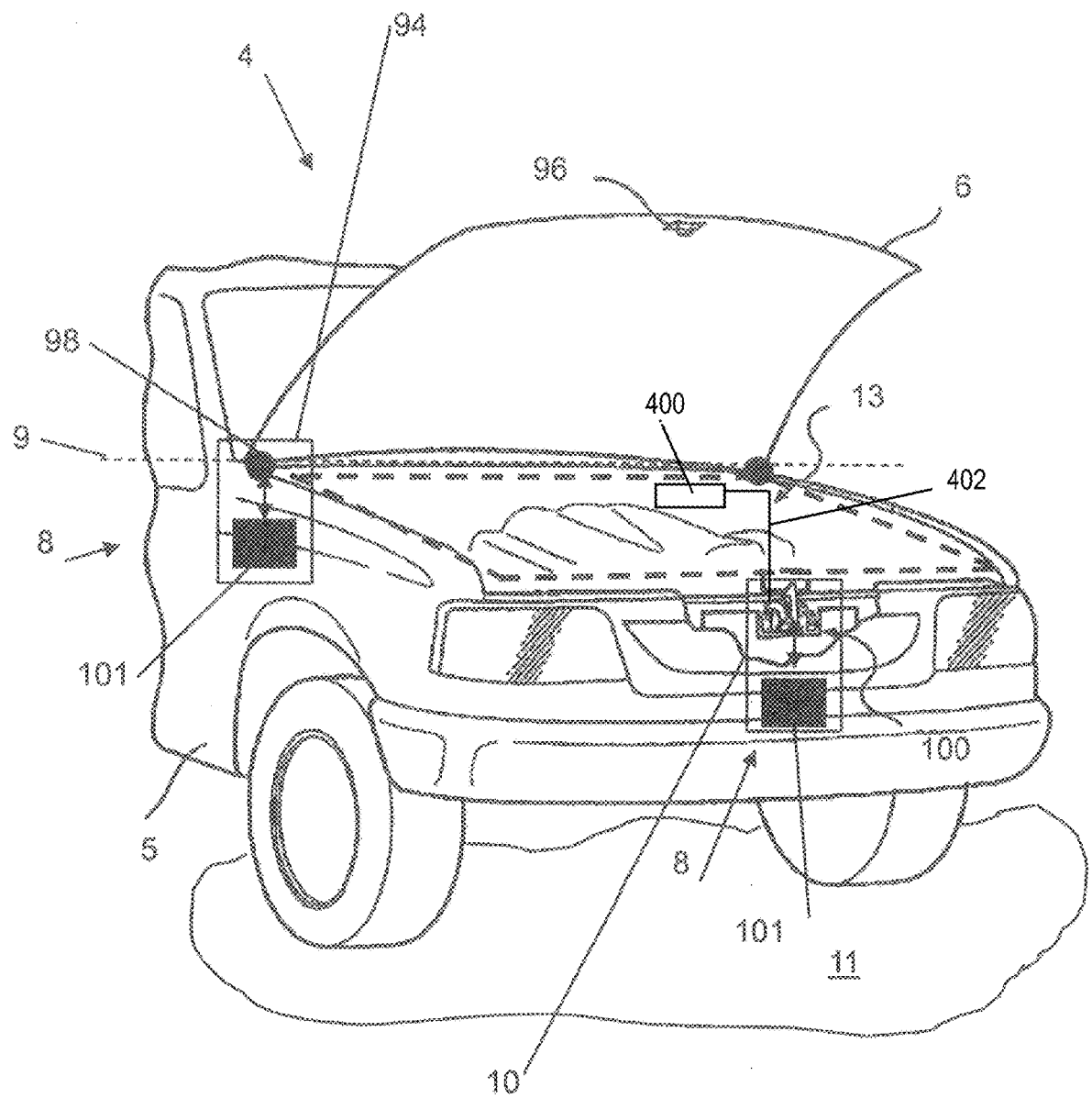
FIG. 1 is a perspective view of an example vehicle using a safety actuation system.

Referring to FIG. 1, shown is a vehicle 4 with a vehicle body 5 having one or more closure panels 6. The closure panel 6 is connected to the vehicle body 5 via one or more panel operation components 8, for example such as but not limited to a hinge 98 and/or a latch 100 (e.g. for retaining the closure panel 6 in a closed position once closed or for retaining the closure panel 6 in an open position once opened). It is also recognized that the hinge 98 can be configured as a biased hinge that can be configured to bias the closure panel 6 towards the open position and/or towards the closed position. Further, the panel operation component 8 can be configured as a lift assist system including one or more struts, not shown, for example used in tail lift gate systems. The closure panel 6 can have a mating latch component 96 (e.g. striker) mounted thereon for coupling with a respective panel operation component 8 (e.g. latch) mounted on the vehicle body 5. Alternatively, the panel operation component 8 can be mounted on the closure panel 6 and the mating latch component 96 mounted on the vehicle body 5 (not shown). In further alternative, the panel operation component 8 can be used to operatively couple the closure panel 6 to the vehicle body 5, such as the case for the hinge 98.

The panel operation components 8 provide for movement of the closure panel 6 between a closed panel position (shown in dashed outline) and an open panel position (shown in solid outline), such that the operation component(s) 8 can be involved during the movement of the closure panel 6 between the open panel position and the closed panel position (e.g. for a hinge 98), can be involved in driving the movement of the closure panel 6 towards the open panel position (e.g. for an opening latch 100), or can be involved in driving the movement of the closure panel 6 towards the closed panel position (e.g. for a retaining latch 100). In the embodiment shown, the closure panel 6 pivots between the open panel position and the closed panel position about a pivot axis 9 (e.g. of the hinge 98), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 98 includes both pivot and translational components (not shown). As can be appreciated, the closure panel 6 can be embodied, for example, as a hood, passenger door or lift gate (otherwise referred to as a hatch) of the vehicle 4. Also provided is an actuation system 101 coupled to one or more of the panel operation components 8, such that the actuation system 101 is configured for actuating the operation or otherwise bypassing the operation of the one or more panel operation components 8, as further described below. In this manner, the actuation system 101 can be used to forcefully provide, during deployment, some form of force assisted open operation (e.g. full open, partial open, etc.) of the closure panel 6.

For vehicles 4, the closure panel 6 can be referred to as a partition or door, typically hinged, but sometimes attached by other mechanisms such as tracks, in front of an opening 13 which is used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to the opening 13, or closed to secure or otherwise restrict access to the opening 13. It is also recognized that there can be one or more intermediate open positions (e.g. unlatched position such as but not limited to a secondary unlatched position) of the closure panel 6 between a fully open panel position (e.g. unlatched position) and fully closed panel position (e.g. latched position), as provided at least in part by the panel operation component(s) 8. For example, the panel operation component(s) 8 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed and a secondary lock configuration at partially open—for example for latches 100 associated with vehicle hoods as involving a secondary catch 75—see FIG. 3).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the vehicle body 5. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the vehicle body 5 of the vehicle at the front, side or back of the door, as the application permits. It is recognized that the vehicle body 5 can be represented as a body panel of the vehicle 4, a frame of the vehicle 4, and/or a combination frame and body panel assembly, as desired.

Referring again to FIG. 1, the closure panel 6 can be configured as a hood panel of the vehicle 4, such that each hinge 98 and respective actuation system 101 is configured as a hinge assembly 94, and the latch 100 and the actuation system 101 is configured as a latch assembly 10.

Figure 2:
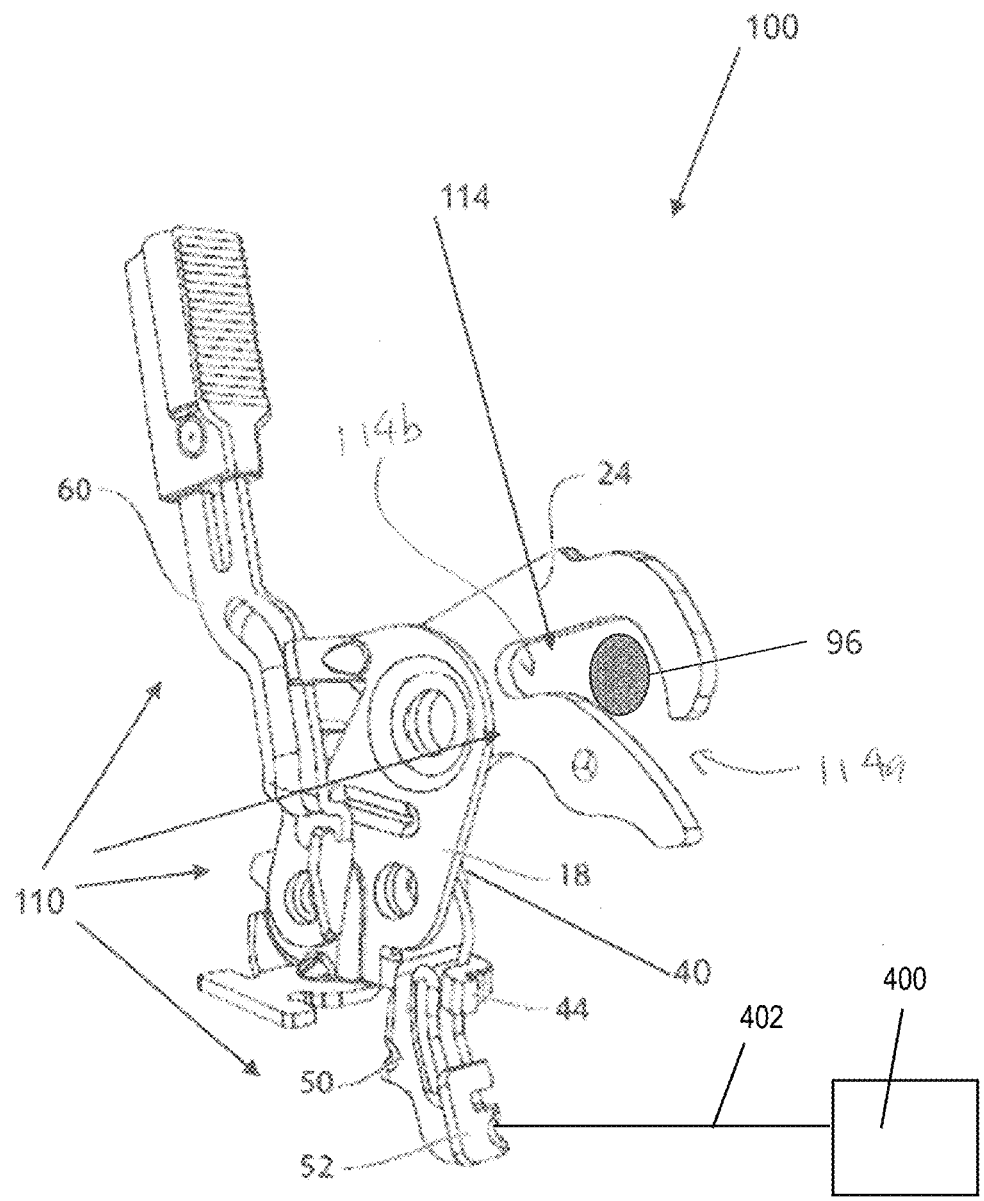
FIG. 2 is a front elevation view of a hood latch of FIG. 1 shown in isolation.

Referring to FIG. 2, one embodiment of the latch 100 includes a mounting plate (70—see FIG. 3) that can be contoured to facilitate attachment of the latch 100 to a frame (e.g. vehicle body 5) of the motor vehicle 4 (see FIG. 1). The mounting plate 70 can be contoured to define a generally planar mounting surface and a plurality of apertures for attaching various components of the latch 100 thereto. Preferably, mounting plate 70 is a stamped metal component. A mating latch component 96 (e.g. striker) is secured to the closure panel 6 (e.g. hood 6) and extends outwardly therefrom. The mating latch component 96 can be a generally U-shaped bar that is engaged by the latch 100 to latch the closure panel 6 in the closed position. The latch 100 is secured to the vehicle body 5 by mounting plate and positioned so that the mating latch component 96 will engage the latch 100 upon the closure panel 6 reaching the closed position. It is appreciated that, alternatively, the latch 100 may be secured to the closure panel 6 and the mating latch component 96 may be secured to the vehicle body 5 of the vehicle 4. Positioned on the mounting plate can be a fishmouth or slot 114 (not shown in FIG. 3A) for receiving the mating latch component 96 therein, in other words the slot 114 of the latch 100 is configured for receiving a keeper (e.g. striker) of the mating latch component 96. The slot 114 has an open top end 114a and a closed bottom end 114b. The latch 100 can also include a cover plate 72 (shown in ghosted view). The mounting plate 70 (see FIG. 3) and the cover plate 72 can be interconnected by first and second rivets (not shown) that each have respective integral shafts (not shown) extending beyond the cover plate. The mounting plate 70, cover plate 72 and the interconnecting rivets can provide a housing 74 for the latch 100. Those skilled in the art will appreciate that a wide variety of alternative configurations may be deployed to provide the housing 74.

The latch 100 includes a number of latch elements 110 (e.g. a ratchet 24 and a pawl 40) that are configured to couple to the mating latch component 96 in order to retain the mating latch component 96 within the slot 114 when the closure panel 6 is in the closed position (e.g. locked or otherwise called the primary latched position). Alternatively, the latch elements 110, both of which are pivotally secured to the frame plate. The ratchet 24 can include a pair of arms spaced apart to define the generally u-shaped slot 114 there between (e.g. a hook arm and a lip arm that extends laterally beyond the hook arm). The ratchet 24 can also include a primary shoulder stop and a pointed secondary shoulder stop. Note that in FIG. 2 the ratchet 24 is shown in a fully closed position (e.g. facilitating the retention of the mating latch component 96 in the slot 114) which may also be referred to as the primary latched position.

The ratchet 24 can be biased to an open position by a torsion spring that is mounted pivotally on the rivet shaft and connected between the cover plate 72 and the mounting plate 70. The torsion spring is an example of a ratchet biasing member, which biases the ratchet 24 towards the open position. The ratchet 24 moves between an unlatched position for releasing the mating latch component 96 and a latched position, such that the mating latch component 96 is received in the slot 114 and cooperates with the receiving slot 114 of the mounting plate 70. The ratchet 24 is biased to the unlatched position via a biasing member. The pawl 40 has can have a shoulder (or detent) that interacts or otherwise engages with primary and secondary shoulder stops of the ratchet 24, in order to releasably retain the ratchet 24 in the latched position. The pawl 40 can also feature a primary release tab 44 and/or a secondary release tab.

The pawl 40 is biased to a locking position (e.g. latched position) where the ratchet 24 is shown in a primary latched position by a torsion spring (represented by arrow 33). The torsion spring is an example of a pawl biasing member.

Accordingly, the pawl 40 can be biased to disengage with the ratchet 24 via the pawl biasing member.

A release lever 50 can also pivotally mounted between the mounting plate 70 and the cover plate 72. The primary release lever 50 can include a tab 52 for connection to a release cable 402 that is connected to a release handle 400 located in the vehicle 4 compartment for initiating by an occupant for opening of the latch 100. The end result of normal operation of the release lever 50 is that the pawl 40 is disengaged with the ratchet 24, under action of the pawl biasing member, thus allowing the ratchet biasing member to assist in pivoting the ratchet 24 from the closed (or latched position to the open or unlatched position (not shown)). The primary release lever 50 can interact with the pawl 40 via its primary release tab 44 and can thus also be biased by pawl biasing member into the non-engaged position. It is recognized that the release lever 50 can be connected to a cam 200, see FIG. 3, in order to move the release lever 50 or pawl 40 before deployment of actuator system 101 (see FIGS. 5a and 5C) as further described below.

Figure 3:
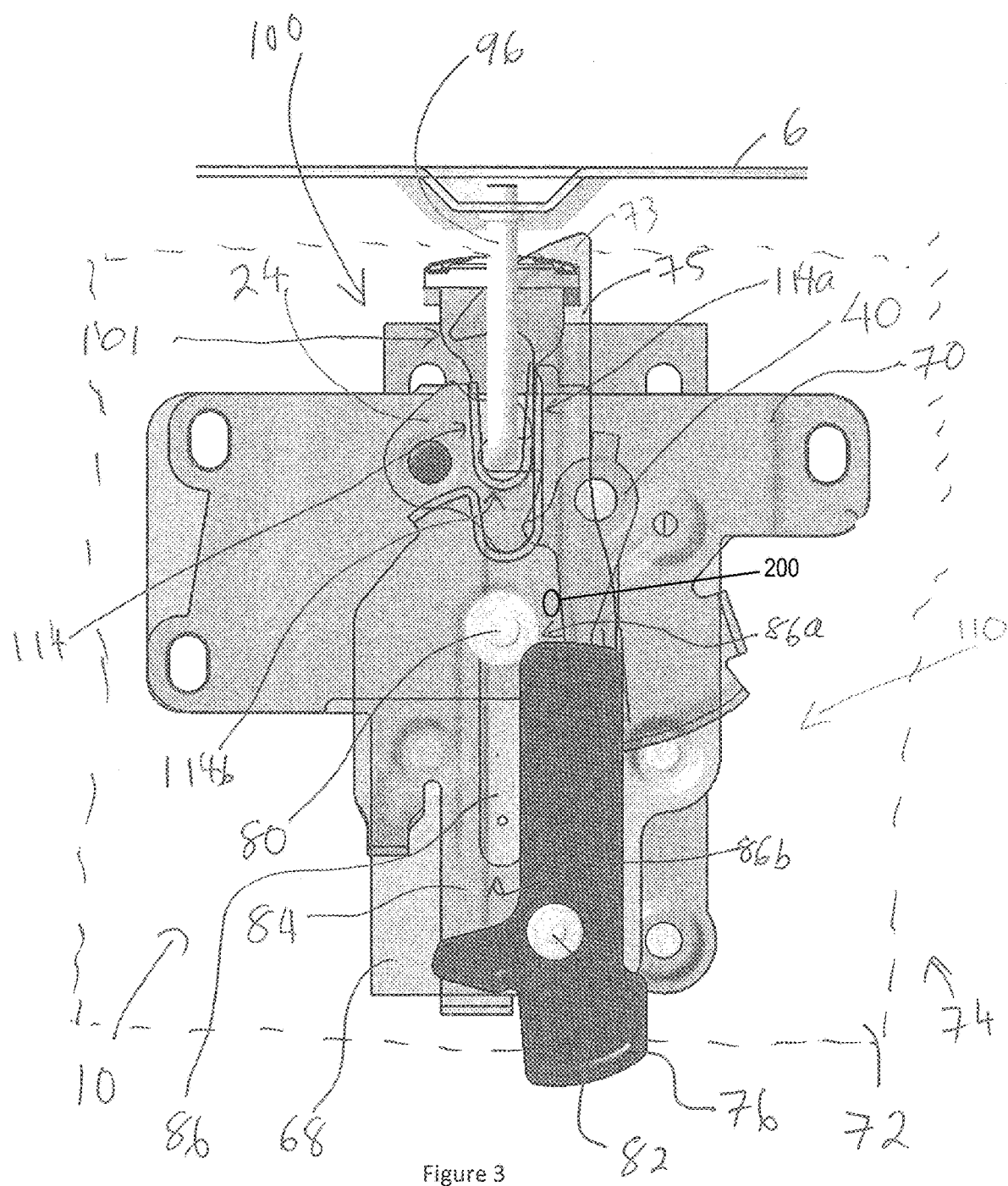
FIGS. 3 and 3A is an embodiment of a latch assembly for the latch of FIG. 2.
Figure 3A:
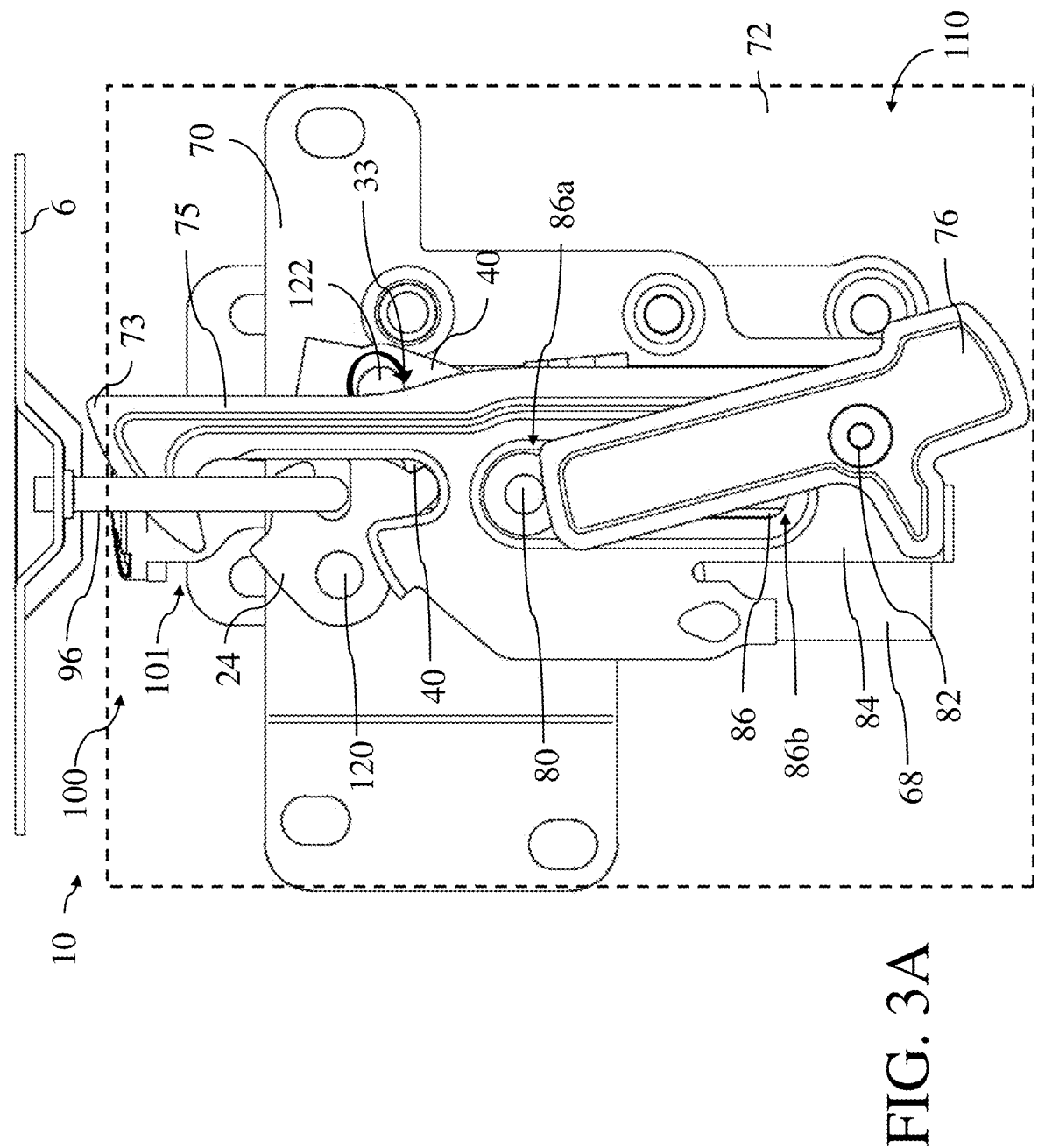

As noted above, however, the latch assembly 10 can be coupled to actuation system 101, shown in FIG. 1 and FIG. 3. The actuation system 101 includes a support plate 68 that can connect to the mounting plate 70 of the latch 100 by connectors 69 (e.g. pins) and thereby can form part of the housing 74, as desired.

Referring to FIG. 4b, shown is a side view of the latch assembly 10 with the support plate 68 connected to the mounting plate 70 by one or more connectors 69 (e.g. a pair of connectors 69). The connector(s) 69 reside in one or more respective support slot(s) 71 (or support tracks 71), such that each connector 69 when permitted travel T along the support slot 71, as further described below, provides for desired relative displacement between the support plate 68 and the mounting plate 70 post activation of the actuation system 101 (see FIG. 7a, 7b). Further, it is recognized that limited relative displacement can also be provided for via the travel T of the connector(s) 69 in the support slot(s) 71 (see FIGS. 5a,5b,5c,5d), as desired. It is recognized that the connector(s) 69 can be mounted on the mounting plate 70 and the support slot(s) 71 can be in/on the support plate 68. Alternatively, it is recognized that the connector(s) 69 can be mounted on the support plate 68 and the support slot(s) 71 can be in/on the mounting plate 70. In any event, it is recognized that the connector(s) 69 and the support slot (s) 71 provide for a sliding coupling between the support plate 68 and the mounting plate 70 in order to facilitate desired relative displacement T there between along a displacement axis 90. The support slot(s) 71 have a first support end 71a and a opposed second end 71b, such that the travel T can be related to the distance between the ends 71a,b.

Referring again to FIGS. 3 and 3a, the latch components 110 can include the secondary catch 75 and a coupling lever 76. The secondary catch 75 can move (e.g. pivot) about a catch connector (e.g. pivot pin) 80 and the coupling lever 76 can move (e.g. pivot) about a lever connector (e.g. pivot pin) 82, such that the catch connector 80 can (e.g. pivotally) mount the catch lever 75 to the mounting plate 70 and the lever connector 82 can (e.g. pivotally) mount the coupling lever 76 to the mounting plate 70. The coupling lever 76 can be responsible for disengaging the secondary catch 75 from the support plate 68 in order to provide for the relative displacement (initial and/or further relative displacement— see FIGS. 5a,b,c,d and 7a,b,c,d) between the mounting plate 70 and the support plate 68.

Referring again to FIGS. 3 and 3a, the secondary catch 75 can have a catch body 84 having a catch slot 86 (or catch track 86), in which the catch connector 80 resides. The catch body 84 has a hook portion 73 for encountering and retaining the mating latch component 96 as the mating latch component 96 travels out of the slot 114 from the primary latched position (see FIG. 4a) to the secondary latched position (see FIG. 6a). It is recognized that the ratchet 24 is in the primary latched position in FIG. 4a,c (as the pawl 40 and the ratchet 24 are engaged at lock position L), thus retaining the mating latch component 96, and is in an unlatched state in FIG. 5a,c (as the pawl 40 and the ratchet 24 are disengaged from one another at lock position UL) to allow for subsequent travel of the mating latch component 96 out of the slot 114 and into the secondary latched position shown in FIG. 6a,c. It is recognised that travel of the mating latch component 96 out of the slot 114 can be assisted by the biasing element of the ratchet 24 as well as the force of the actuation system 101 on the mating latch component 96 (see FIGS. 6a,6b).

In the case of the catch slot 86, the coupling lever 76 can have a blocking portion 88 (e.g. face 88) in order to restrict movement/travel in the catch slot 86 of the catch connector 80 during normal (e.g. pre actuation of the actuation system 101) operation of the latch 100. It is recognized that the catch connector 80 can be mounted on the mounting plate 70 and the catch slot 86 can be in/on the catch body 84. Alternatively, it is recognized that the catch connector 80 can be mounted on the catch body 84 and the catch slot 86 can be in/on the mounting plate 70. In any event, it is recognized that the catch connector 80 and the catch slot 86 provide for a sliding coupling between the catch body 84 and the mounting plate 70 in order to facilitate desired relative displacement D (see FIG. 6a) there between along the displacement axis 90 during actuation of the actuation system 101. The catch slot 86 can have a first catch end 86a and an opposed second catch end 86b, such that the travel D (see FIG. 6a) of the catch body 84 can be related to the distance between the catch ends 86a,b. It is also recognized that the magnitude of the travel D and the travel T can be the same or different, as desired.

Figure 4C:
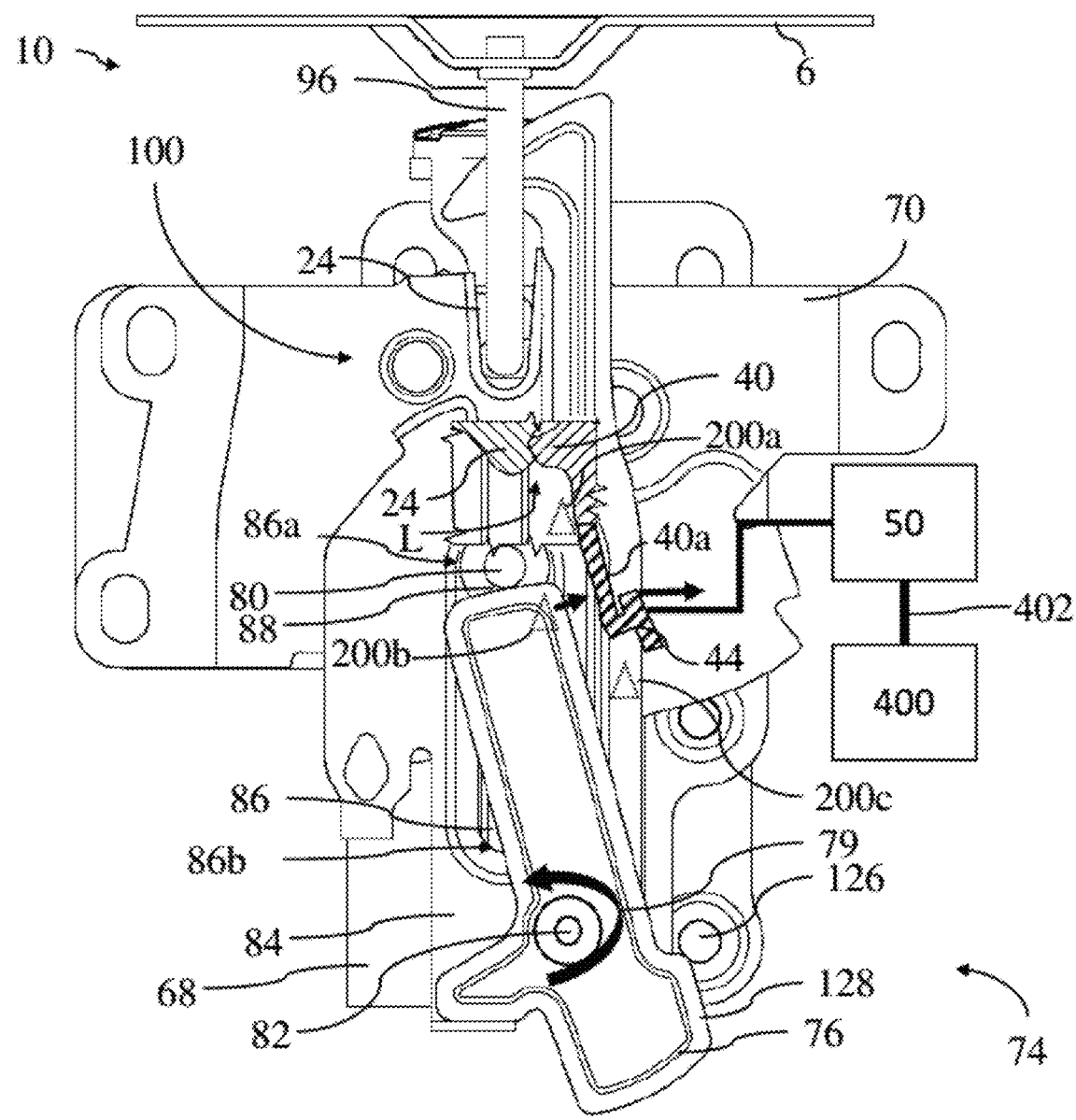
Figure 4D:
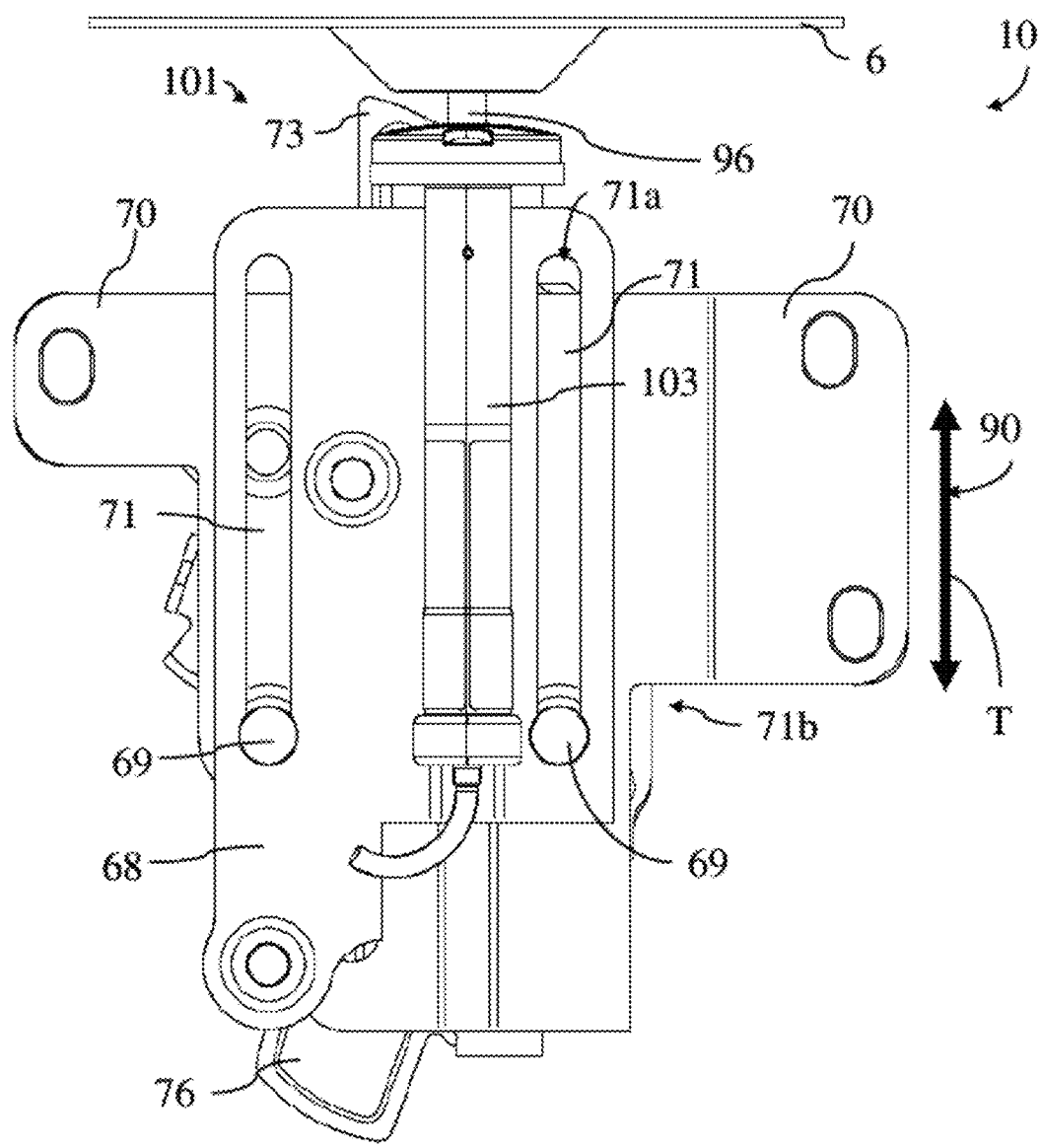
Figure 5C:
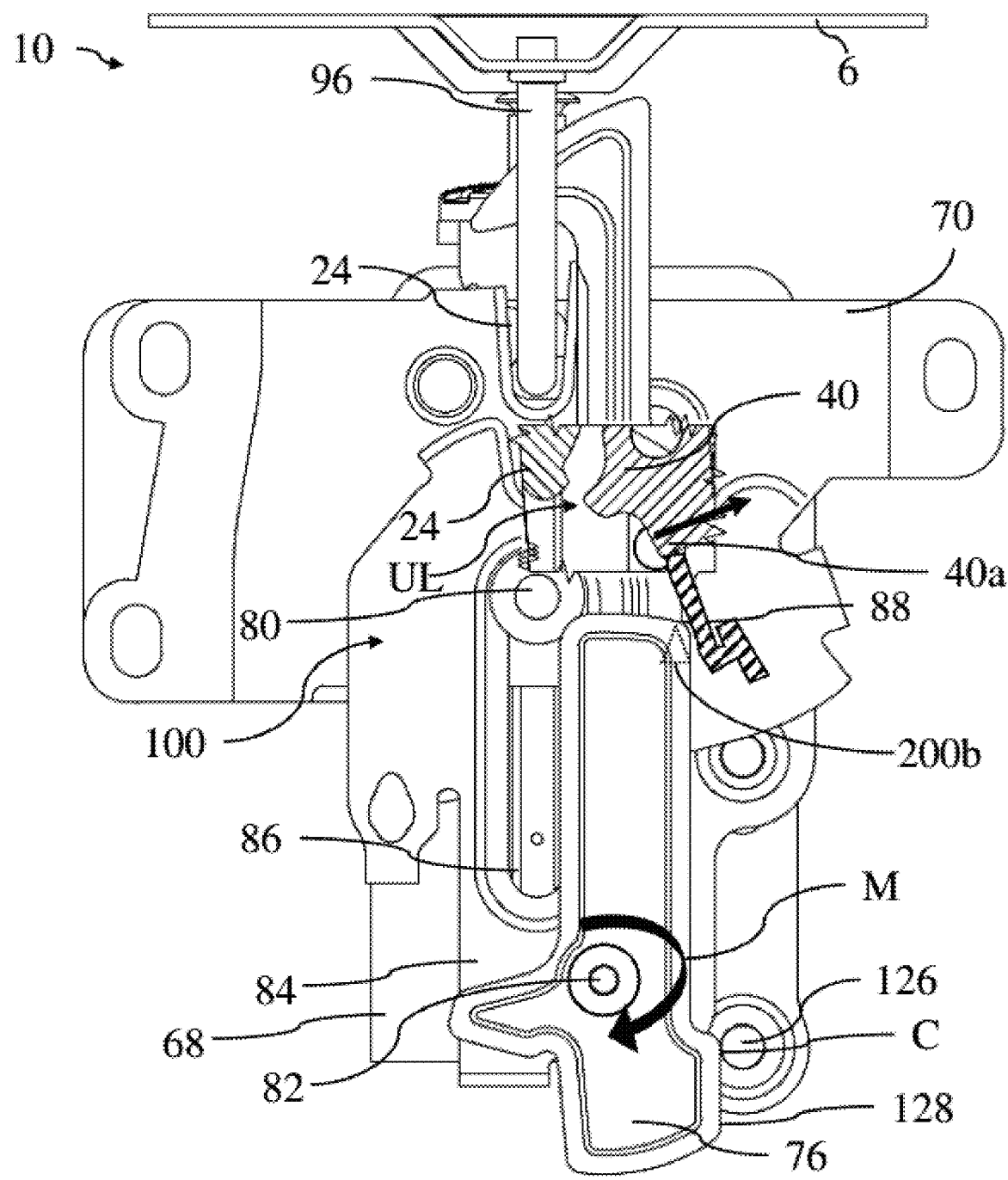
Figure 5D:
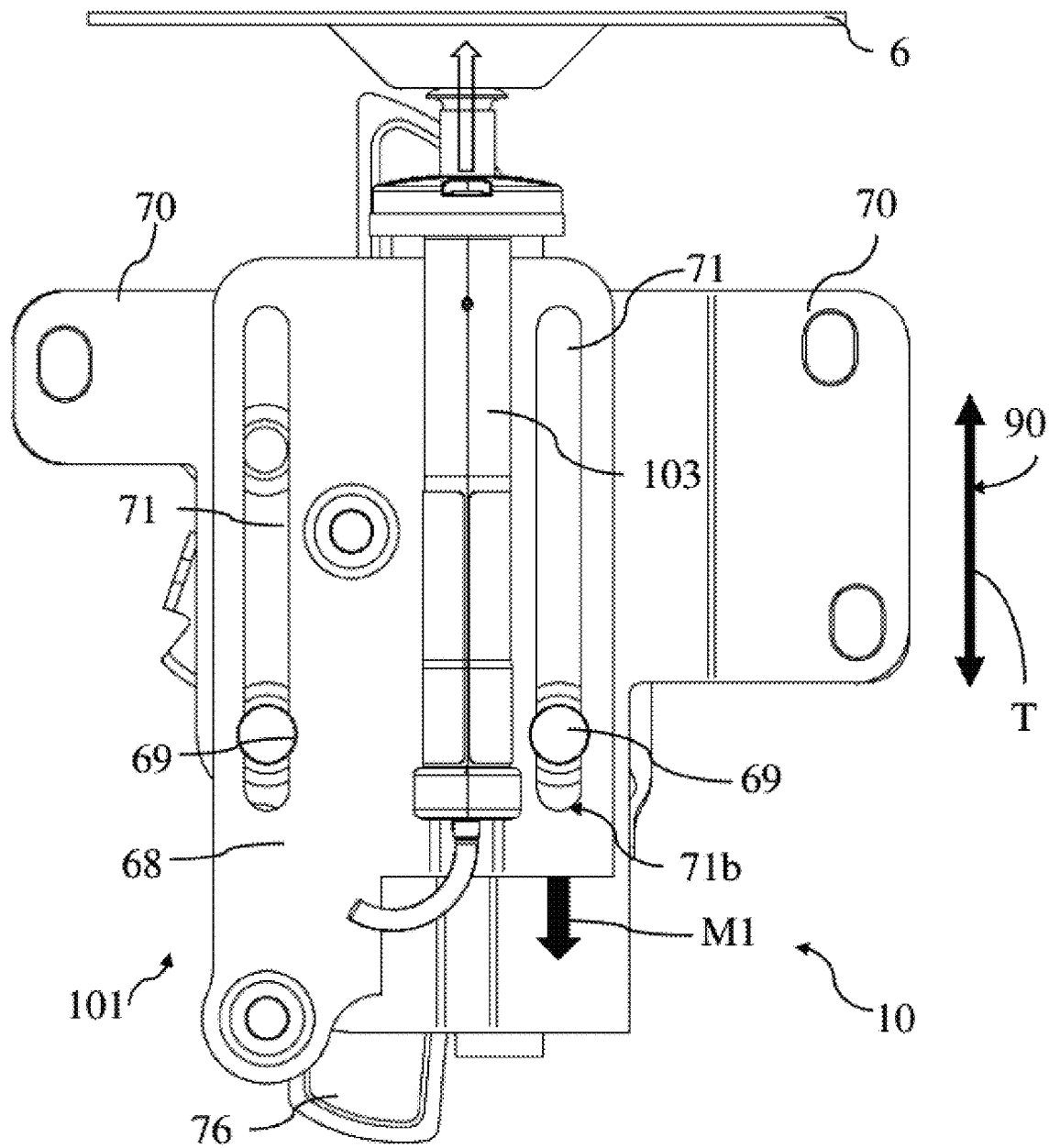

Referring to FIG. 4a, shown is the ratchet 24 restrained by the pawl 40 at the lock position L (e.g. ratchet 24 surface at lock position L is in contact with pawl 40 surface at lock position L), thus retaining the mating latch component 96 in the slot 114. Referring to FIG. 5a,c, shown is the ratchet 24 unrestrained by the pawl 40 at the unlock position UL (e.g. ratchet 24 surface at unlock position UL is in out of contact with pawl 40 surface at lock position L and thus can pivot about ratchet pivot 120), thus allowing for the removal of the mating latch component 96 from the slot 114. The transition between FIGS. 4a and 5a for the pawl 40 can be realized by pivot P of the pawl 40 about pawl pivot 122, thus disengaging the pawl 40 from the ratchet 24 at lock position L. For example, a cam 200a, such as an upstanding lug, provided on the catch body 84 can engage the pawl 40 e.g. pawl lever 40a (or release lever 50) to force pawl 40 about pawl pivot 122, thus disengaging the pawl 40 from the ratchet 24. Illustratively, cam 200a, shown in phantom outline in FIG. 4C, is urged into contact with pawl 40 as cam 200a is moved in the upward direction caused by a corresponding upward movement of catch body 84 in a manner as will be described herein below. Cam 200b is also shown as alternatively mounted on coupling lever 76 to engage the pawl 40 e.g. pawl lever 40a during an illustrative clockwise rotation of coupling lever 76 (e.g. see FIG. 5C). Alternatively, the blocking portion 88 of the coupling lever 76, for example, can be used to contact pawl arm 40a in order to pivot P the pawl 40, as the coupling lever 76 moves M about the lever connector 82 (e.g. pivots). Cam 200c is also shown as alternatively mounted on support plate 68 to engage the pawl 40 e.g. pawl lever 40a during an illustrative upward movement of support plate 68. At the same time, Movement M of the coupling lever 76 about the lever connector 82 can disengage the blocking portion 88 from the catch connector 80, thus freeing the catch connector 80 to move within the catch slot 86 (e.g. travel between the catch ends 86a,b. It is recognized that movement M of the coupling lever 76 can be caused by contact between a decoupling member 126 (e.g. pin/tab, etc.) and a lever surface 128 of the coupling lever 76. For example, as shown in FIG. 4a,c the decoupling member 126 adjacent to and out of contact with lever surface 128, as compared to FIG. 5a,c whereby the support plate 68 has been initially displaced (e.g. away from the closure panel 6) to result in contact C between the lever surface 128 and the decoupling member 126, thus causing the movement M of the coupling lever 76 in order to enable travel D of the catch connector 80 in the catch slot 86 and allow catch body 84 and thus cam 200a to move upwardly such that cam 200a contacts pawl 40 to disengage the pawl 40 from the ratchet 24. The decoupling member 126 can be mounted on the support plate 68. It is recognized that in FIGS. 4a,b, the position of the support plate 68 relative to the mounting plate 70 along the axis 90 can be referred to as a rest position.

Reference is made to the above figures, which show the actuation system 101. The device of the actuation system 101 can include a fluid-actuated cylinder 103, a control valve (not shown) and a source of pressurized fluid 104. The cylinder 103 can include a cylinder housing and a piston 102 that is movable in the cylinder housing between an unactuated position (see FIG. 4b) and an actuated position (see FIG. 6b). Also shown is a partially actuated position (see FIG. 5b) which can be used to decouple the support plate 68 from the mounting plate 70, as well as cause the decoupling of the pawl 40 from the ratchet 24 and the coupling lever 76 from the catch connector 80. A piston biasing member (not shown) can be provided and can bias the piston 102 towards the unactuated position, so as to keep the piston 102 in the unactuated position when the vehicle 4 is not incurring a collision event. In the unactuated position, the control valve can prevent fluid flow to the cylinder 103 thereby preventing actuation of the cylinder 103. In the open position, the control valve permits fluid flow from the source 104 of pressurized fluid to the cylinder 103 to drive the piston 102 to the actuated position. The source 104 of pressurized fluid may simply be a vessel containing any suitable fluid, such as, for example, compressed Carbon Dioxide at a suitable pressure, such as, for example 2000 psi. In this embodiment, the control valve can be referred to as a release member that is controllable to expose the piston 102 to the pressurized fluid of the source 104. In another embodiment, the source 104 of pressurized fluid may be an inflation device that is similar to an airbag inflation device, and that includes an igniter and two combustible chemicals, such as Sodium Azide and Potassium Nitrate, which, when ignited by the igniter, generate Nitrogen at high pressure which can be used to drive the piston 102 to the actuated position. In such an embodiment, a control valve would not be needed. However, a controller can control the operation of the igniter. In such an embodiment, the igniter may be referred to as a release member that is controllable to expose the piston 102 to the pressurized fluid.

Once the actuation system 101 is actuated (e.g. fired), the coupling lever 76 moves M from the coupled position in FIG. 4a,c to the uncoupled position in FIG. 5a,c. This can be realized by contact of the decoupling member 126 with the lever surface 128. It is recognized that the contact between the decoupling member 126 and the lever surface 128 can be realized by moving M1 the support plate 68 initially away from the closure panel 6 during a first stage of actuation of the actuation system 101, as by example the decoupling member 126 is mounted on the support plate 68. Another option is for piston 102 of the actuation system 101 to contact and thus move M the coupling lever 76 during the first stage of actuation of the actuation system 101. In any event, the first stage of actuation of the actuation system 101 can be used to provide contact between the piston 102 and the matching latch component 96 (or other suitable portion 6a of the closure panel 6), in order to move the closure panel 6 away from the latch 100. It is also recognized that in the first stage of actuation of the actuation system 101, the pawl 40 is disengaged from the ratchet 24 (e.g. via contact between the cam 200 and the pawl 40 during the movement M of the coupling lever 76).

Figure 6C:
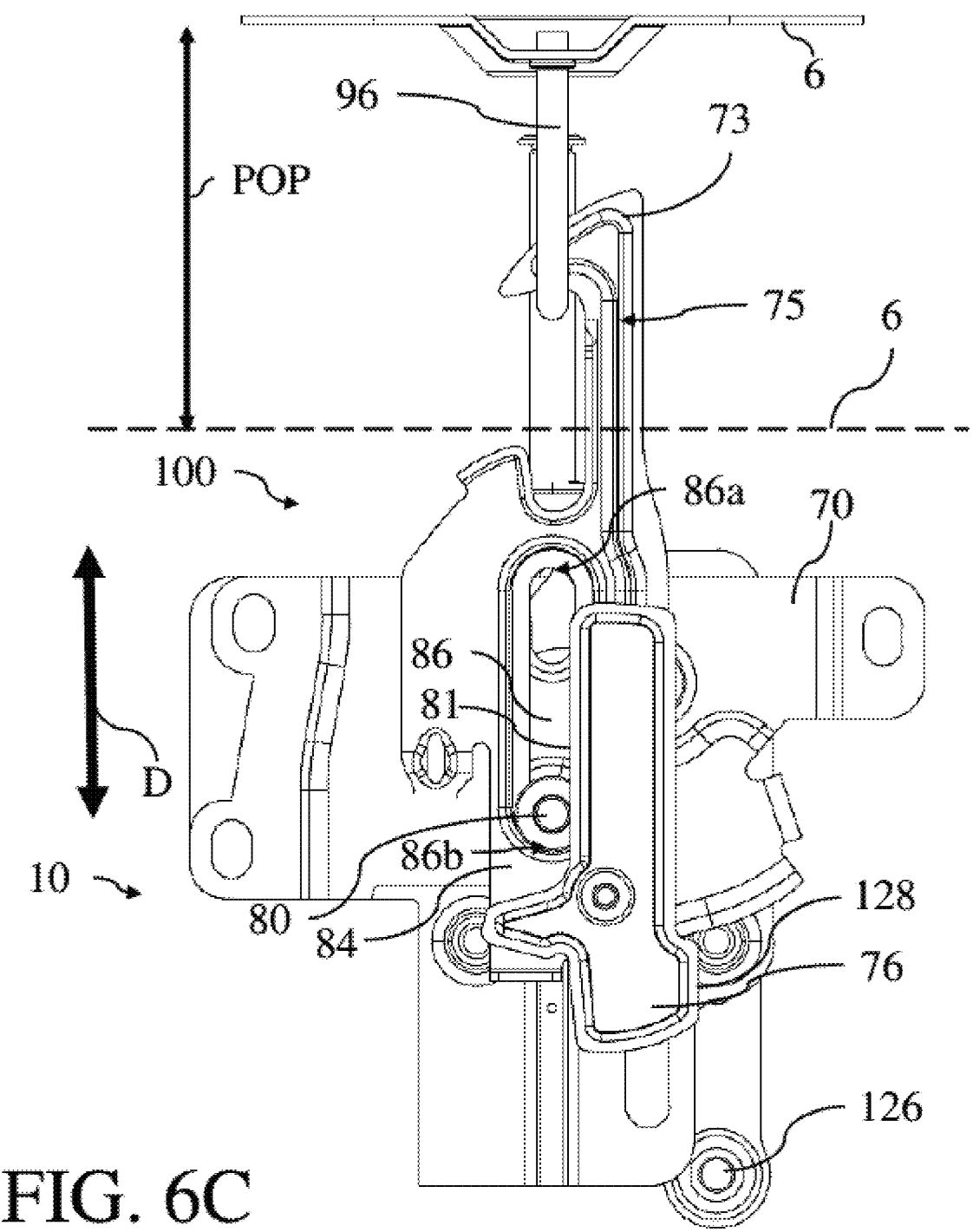
Figure 6D:
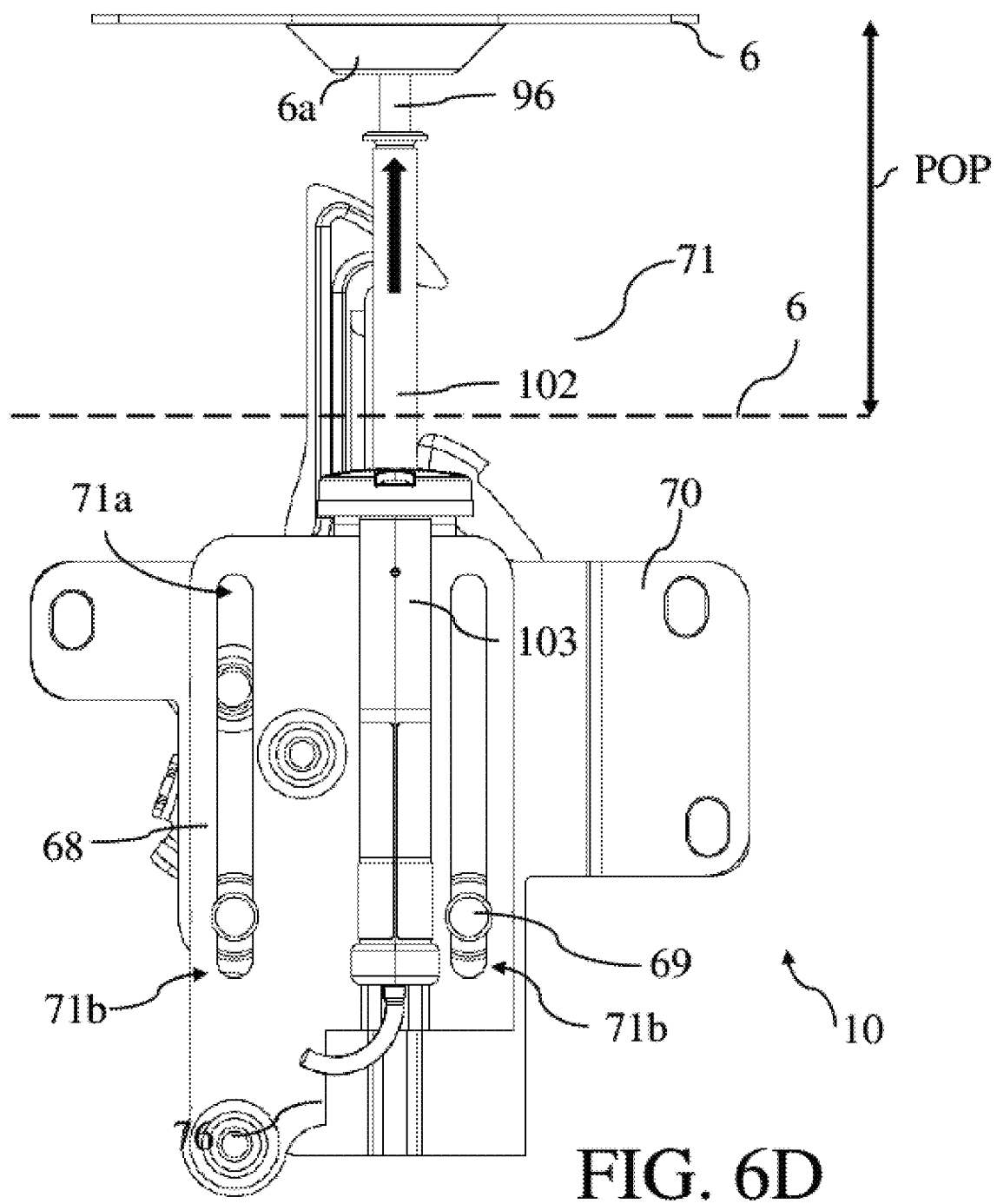

In a second stage of actuation of the actuation system 101, the piston 102 of the actuation system 101 pushes on the mating latch component 96 (or the closure panel portion 6a) in order to move (e.g. raise) the closure panel 6 away from the latch 100. During this stage, the travel D of the catch lever 75 can be realized by moving the catch connector 80 from the first catch end 86a to the second catch end 86b, —see FIGS. 5b,d, 6b,d, thus providing for the desired pop up travel POP of the closure panel 6, shown in the final pop up position as well as in the original position (in ghosted view). It is recognized that the distance of the pop up travel POP is relative to the displacement of the piston 102 as actuated during operation of the actuation system 101. It is also recognized that since the secondary catch 75 is retaining the mating latch component 96 during the second stage of actuation, the catch connector 80 can also slide/travel in the catch slot 86 as shown. Catch connector 80, as shown in FIG. 6C maintains coupling lever 76 in its pivoted position by contacting along lever surface 81. The mating latch component 96 is prevented by the secondary catch 75 to continue in an unrestricted upward travel due to the momentum of the closure panel 6 gained as a result of displacement of the piston 102. As such, the position of the closure panel 6 in FIGS. 5a,b is shown in ghosted view in FIGS. 6a,b.

Figures 7A, 7B:
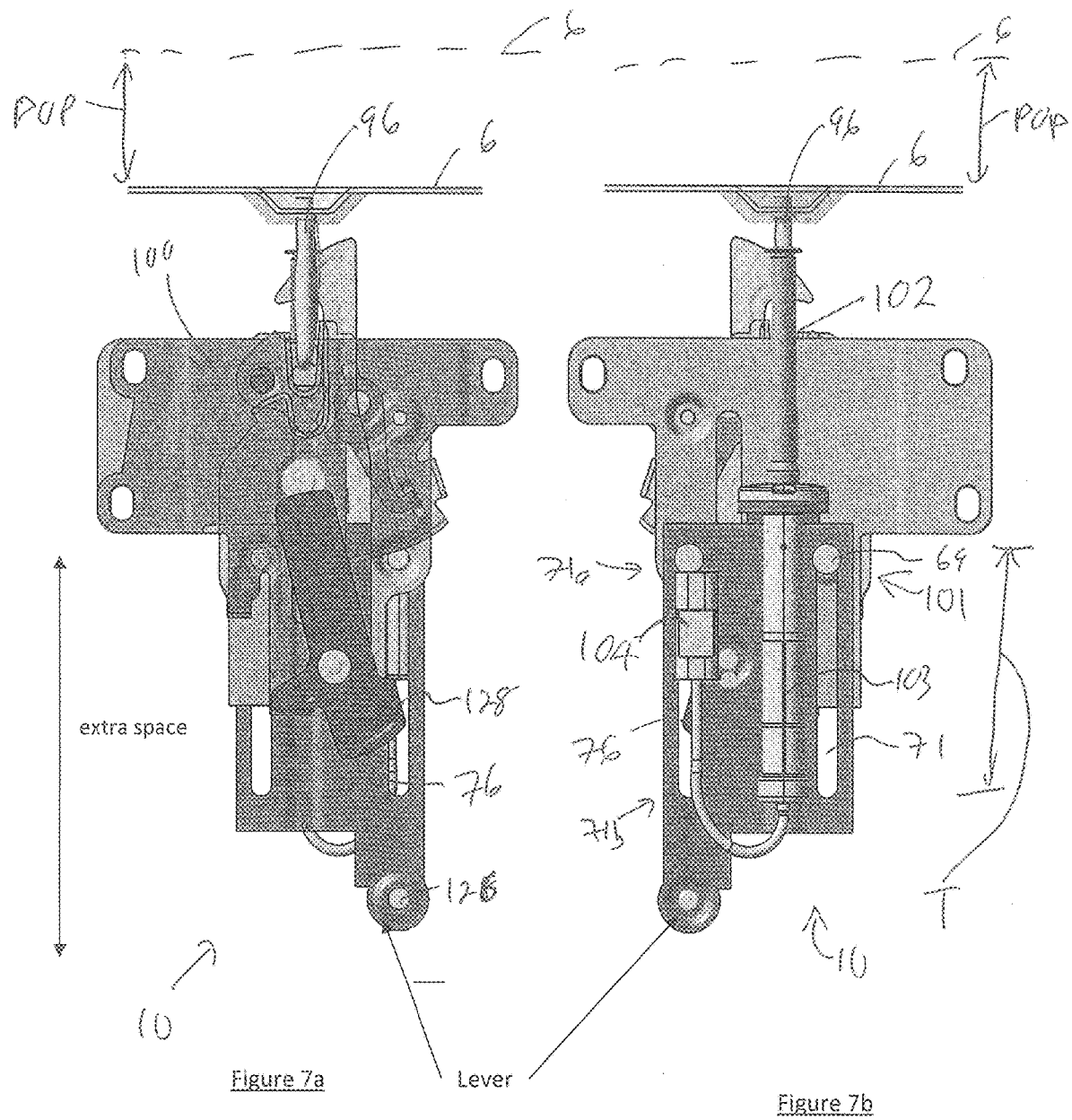
FIGS. 7*a* to 7*d* show a post deployed position of the latch assembly of FIG. 3.
Figure 8A:
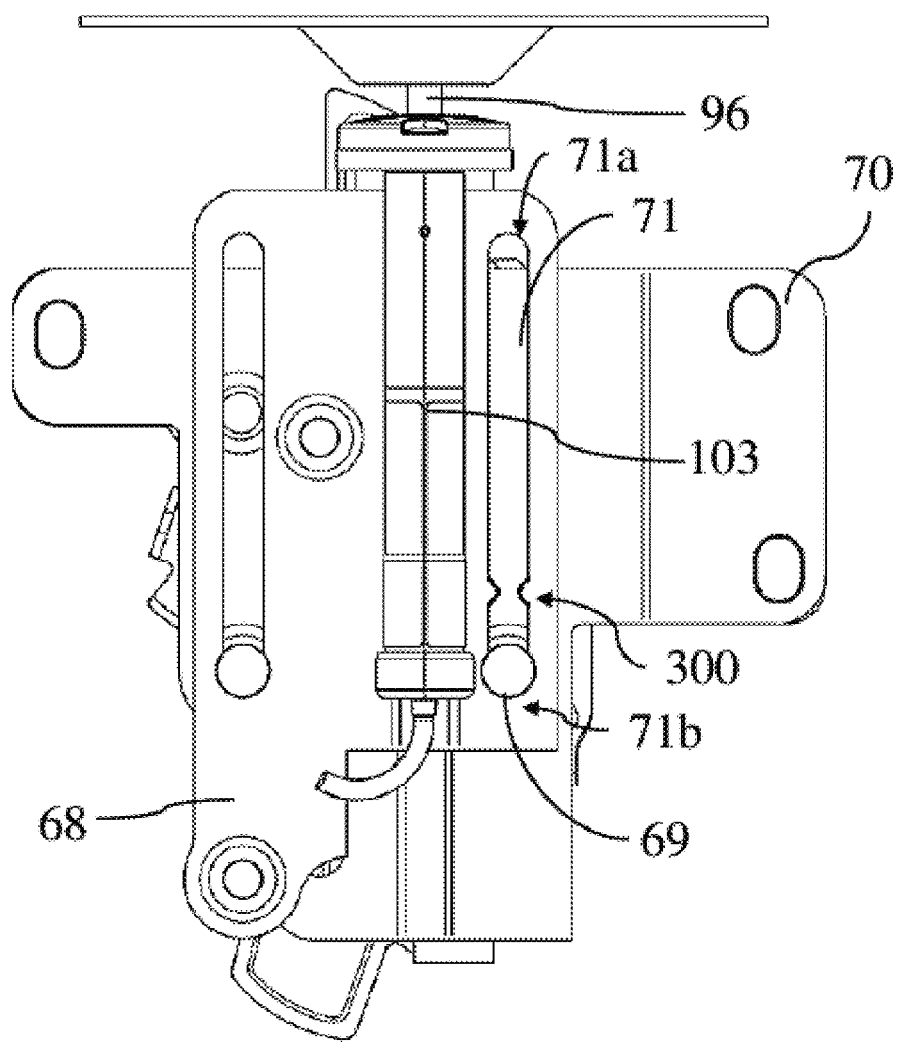
FIGS. 8*a* to 8*e* show a sequence of views illustrating a deformation of a destructible catch of the latch assembly of FIG. 3 to allow the latch assembly to move from the deployed position to the post deployed position, in accordance with an illustrative embodiment.
Figure 8B:
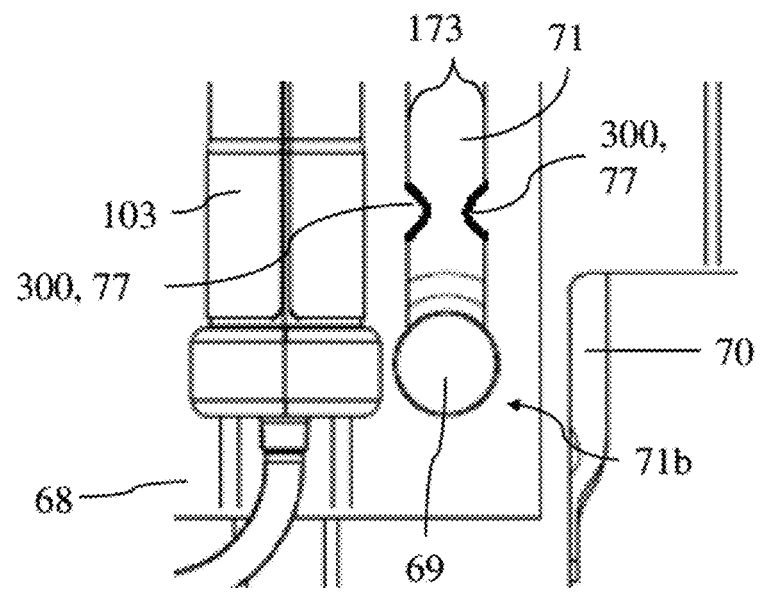
Figure 8C:
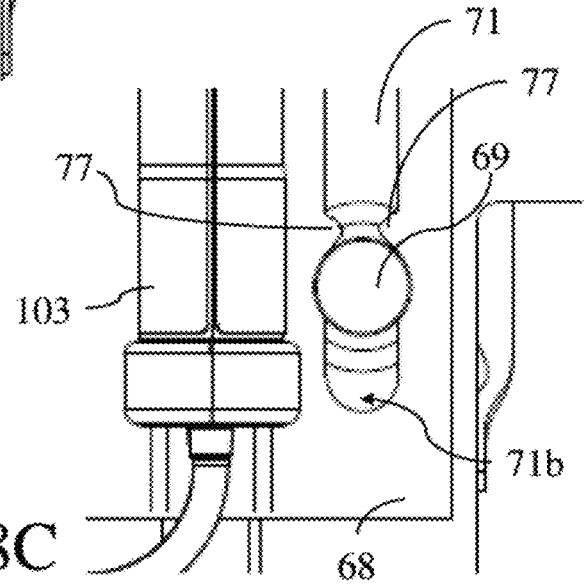
Figure 8E:
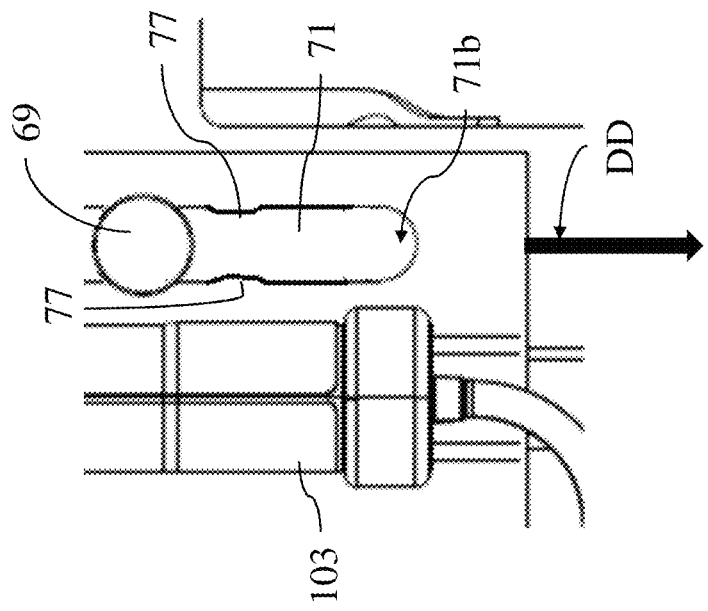
Figure 8D:
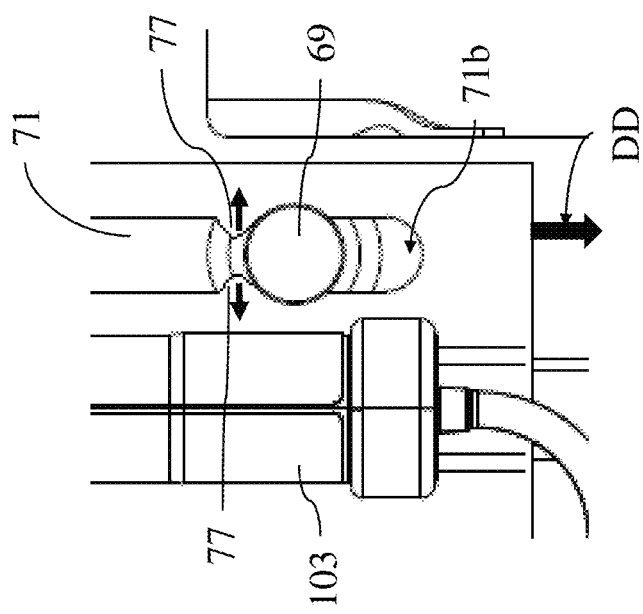

Referring to FIGS. 7a,7b,c,d once the second stage of actuation of the actuation system 101 had been completed and the pop up travel POP of the closure panel 6 has been realized (see FIGS. 6a,b). During the second stage of actuation, the support plate 68 is prevented from moving to a post deployment position by catch feature(s) 300 (e.g. blocking member) illustratively provided along the inner walls 173 of the support slot 71 as inwardly facing deformable projections 77. Catch feature 300 shown in more detail in FIGS. 8A to 8E are provided proximate second end 71b and illustratively project from the inner walls 173 into support slot 71 to prevent travel of the support connector 69 towards the first end 71a. Deformable projections 77 may be formed from the material of the support plate 68 for example by stamping, and may have a deformable/destructible characteristic above a certain application of force, for example as applied by support connector 69 as it travels towards the first end 71a. Support connector 69 may be urged to travel towards the first end 71a by the application of a force F by a user after a collision causing the actuator 103 (now in a deployed state and maintained in such a state due to a pressure build up) to urge the support plate 68 in the downward direction DD and in doing so causing support connector 69 to engage and deform/deflect/crush deformable projections 77 as shown in FIGS. 8D and 8E.

Figure 9A:
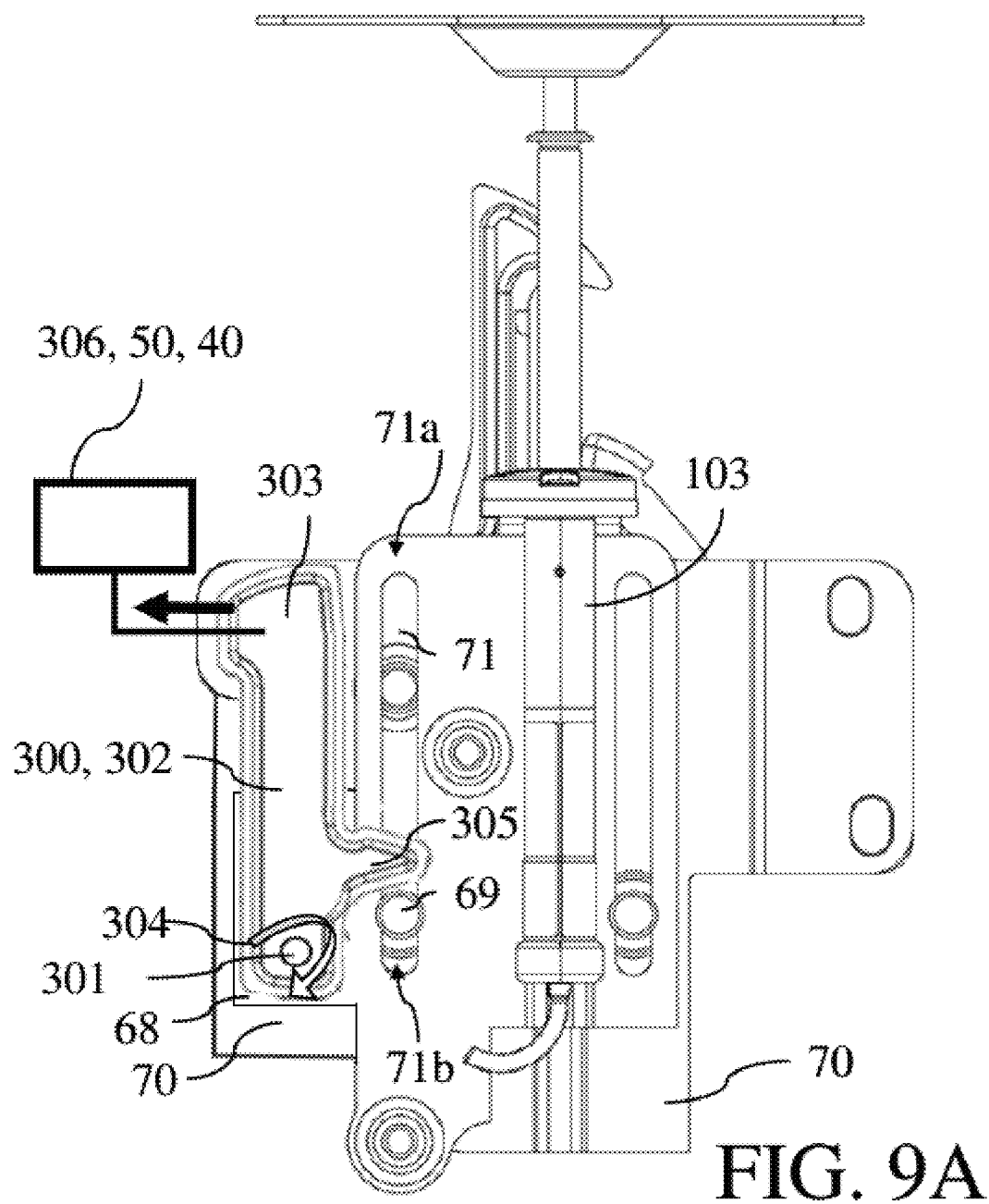
FIGS. 9*a* and 9*b* show a sequence of views illustrating a movement of a non-destructible catch of the latch assembly of FIG. 3 to allow the latch assembly to move from the deployed position to the post deployed position, in accordance with an illustrative embodiment.
Figure 9B:
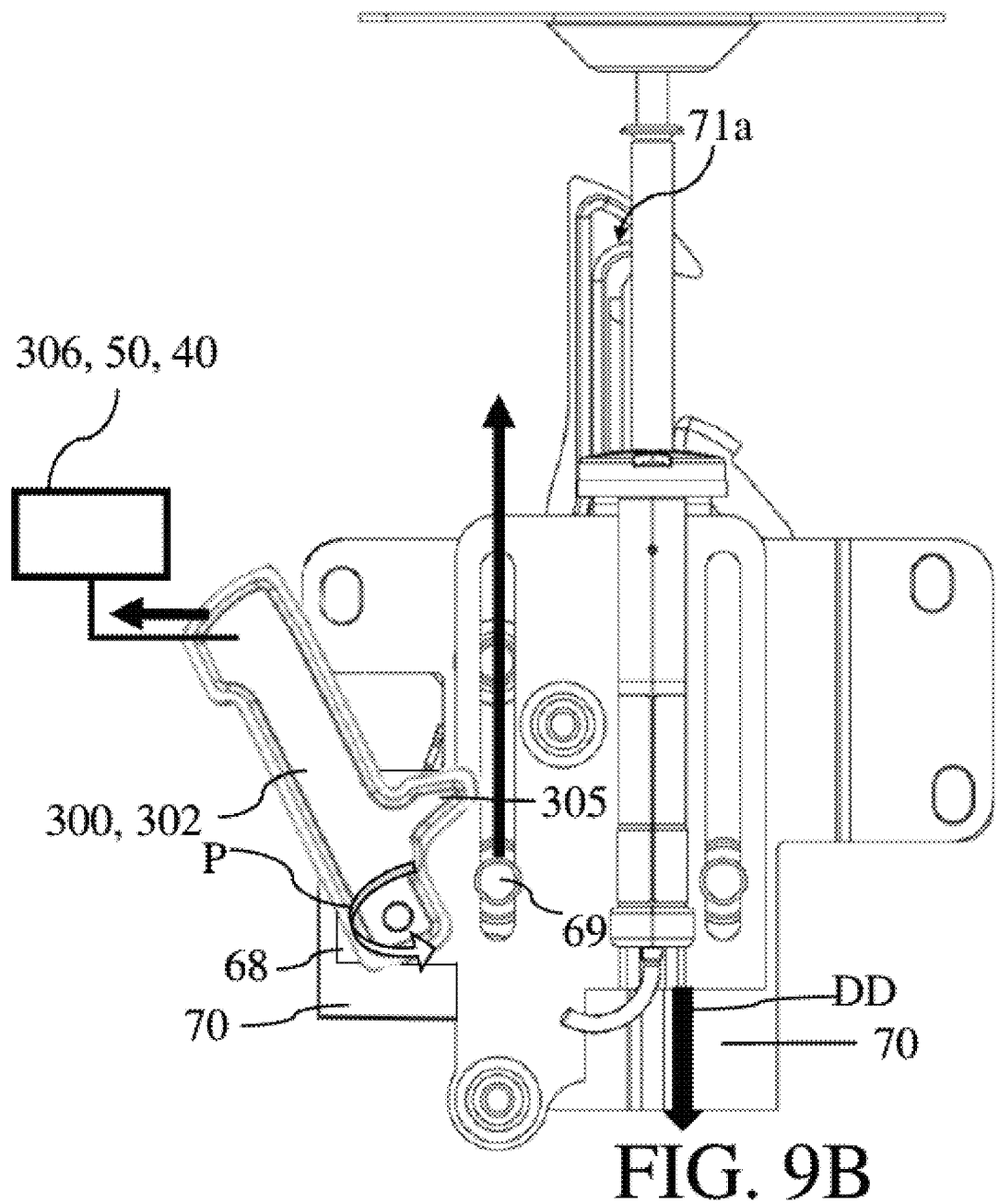

With reference to FIGS. 9A and 9B, in accordance with another embodiment, during the second stage of actuation, the support plate 68 is prevented from moving to a post deployment position by catch feature 300 illustratively provided as a pivotal catch 302. Catch 302 is pivotally mounted to support plate 68 at pivot point 301 and may be biased under influence of a bias 304 in the clockwise direction. Catch 302 in its non-actuated state as shown in FIG. 9A acts to block and prevent travel of the support connector 69 towards the first end 71a. After a collision causing the actuator 103 (now in a deployed state and maintained in such a state due to a pressure build up), the user may actuate a lever or actuator 306 coupled with the catch 302 to cause catch 302 to pivot P to an actuated state to move out of blocking engagement or in a blocking path (e.g. non-destructive action) with the support connector 69 to allow support connector 69 to move towards the first end 71a upon the application of the Force F, or under the weight of the closure panel 6. For example, lever 306 may be accessible by a user from the outside of the vehicle in vicinity to latch 10, or may be accessible from inside the cabin. Alternatively, catch 302 may be activated by pulling inside release handle 400 within the cabin to activate release lever 50 operatively coupled (e.g. via a lug and cam surface arrangement) to act on a lever portion 303 of catch 302 to impart a pivoting of catch 302, and to move a hook portion 305 of catch 302 out of a blocking path with support connector 69.

After overcoming the catch feature 300 by the user applied force F or activation of catch 302, the support plate 68 is allowed to move to a post deployment position by travelling the travel distance T relative to the mounting plate 70, such that the support connector 69 travels in the support slot 71 from the second end 71b to the first end 71a, such that the first end 71a is closer to the closure panel 6 that the second end 71b. It is recognized that catch feature 300 provides sufficient blocking force against movement of the support connector 69 to move towards the first end 71a during the activation of actuator 103 to provide a temporary stop to allow the piston 102 to urge the closure panel 6 upwards without in the process urging the support plate 68 beyond the travel limit within the slot 71 restricted by the catch feature 300.

It is recognized that in FIGS. 7a,b, the position of the support plate 68 relative to the mounting plate 70 along the axis 90 can be referred to as the post deployment position, such that the post deployment position is displaced the travel distance T along the axis 90 in a direction opposite to the pop up travel POP of the closure panel 6 during the second stage of actuation of the actuation system 101. For example, the post deployment position on the axis 90 relative to the rest position can equal to the pop up travel POP distance, depending upon the length of the support slot 71 and the rest position and post deployment position of the support connector 69 within the support slot 71. For example, the post deployment position on the axis 90 relative to the rest position can less than the pop up travel POP distance, depending upon the length of the support slot 71 and the rest position and post deployment position of the support connector 69 within the support slot 71. For example, the post deployment position on the axis 90 relative to the rest position can greater than the pop up travel POP distance, depending upon the length of the support slot 71 and the rest position and post deployment position of the support connector 69 within the support slot 71. As such, the position of the closure panel 6 in FIGS. 6a,b is shown in ghosted view in FIGS. 7a,b.

In view of the above, it is recognized that once the mating latch component 96 is in contact and retained by the secondary catch 75, the latch 100 would be considered in the secondary latched position or secondary closed position. Further, when the mating latch component 96 is retained by the ratchet 24 in the slot 114, this can be referred to as the primary latched position or primary closed position.

It is recognized that synchronous (or in combination) with actuation of the actuation system 101, the pawl 40 (see FIG. 2,3) can be released in order to unlock the ratchet 24 and thus allow the mating latch component 96 to be removed from between the arms of the ratchet 24 and begin travel out of the slot 114. Illustratively, cam 200 mounted to body 84 is illustrated as engaging with pawl 40 during actuation of the actuation system 101 e.g. closure panel 6 pulls secondary catch 75 and body 84 upwardly. Other configurations are also possible. For example, movement of the piston 102 against the pawl 40 can cause actuation of the pawl 40 and thus release of the ratchet 24. Alternatively, movement of the piston 102 against a pawl release tab (not shown) can cause actuation of the pawl 40 and thus release of the ratchet 24. Alternatively, movement of the piston 102 against the coupling lever 76 can cause movement and thus contact between the coupling lever 76 and the pawl 40 in order to effect actuation of the pawl 40 and thus release of the ratchet 24. As such, it is recognised that the pawl 40 (and subsequently the ratchet 24) is released before the piston 102 travel can facilitate the travel of the mating latch component 96 out of the slot 114 and into the secondary latched position as defined by retention of the mating latch component 96 by the secondary catch 75 (e.g. by the hook portion 73).

Figure 7C:
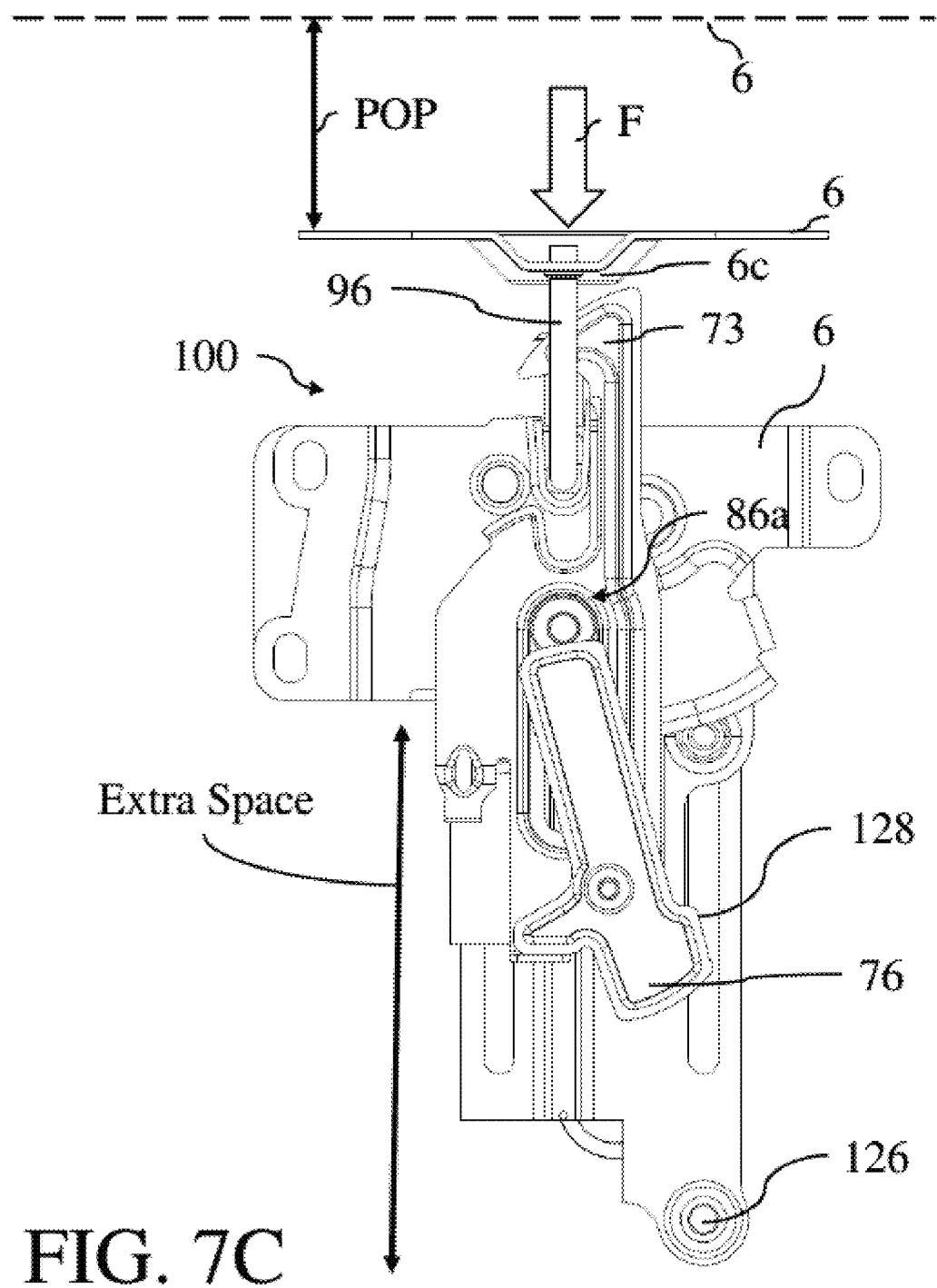
Figure 7D:
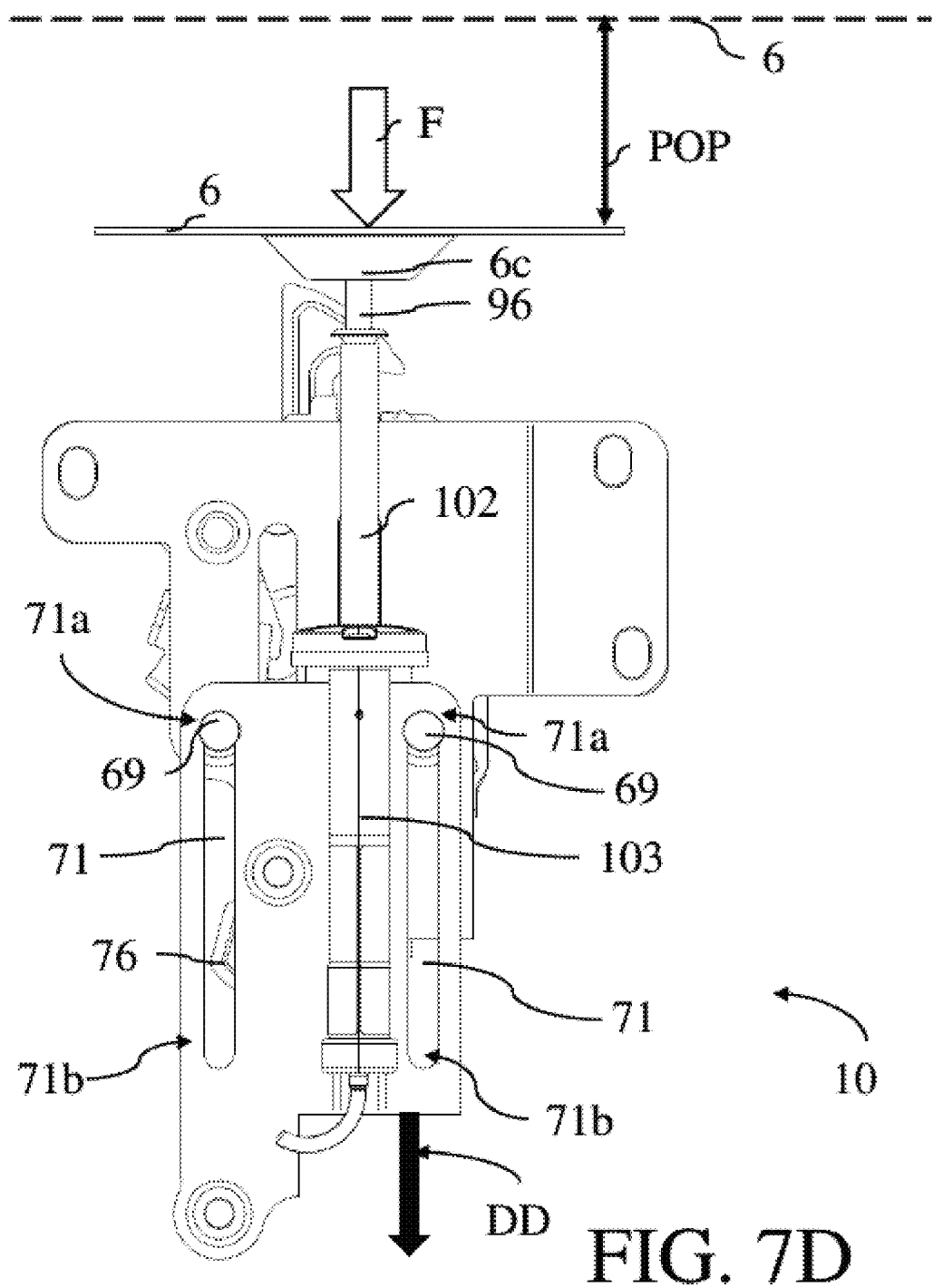

Referring to FIGS. 6a,b, a new active firing travel request latch 100 with actuator system 101 is shown for increased travel (e.g. min 60 mm). As such, the latch 100 shown can represent a hood (e.g. closure panel 6) direct lift with the actuator, e.g. min 60 mm pop-up height during active firing of the chemically powered (e.g. pyro) actuator system 101. The hood 6 can be held in the deployed position by the actuator residue pressure of the actuator system 101. After firing, the deactivation (return to secondary position) can be done by urging downwards on closure panel 6 allowing the support plate 68 to displace relative to the mounting plate 70 along the axis 90 during pushing down of the closure panel 6 back towards the latch 100, to provide the force to destroy catch feature 300 in the destructible embodiment as described herein below. Alternatively, in an embodiment where catch feature 300 is non-destructive, after firing, the deactivation (return to secondary position) can be done by pulling the inside release handle 400 coupled to the release lever 50, via a cable 402 provided from the interior vehicle cabin to the latch 100 as shown in FIG. 1, thus releasing the pawl 40 and thus, and at the same time moving catch 302 to an actuated position, as will be described herein below to allow the support plate 68 to displace relative to the mounting plate 70 along the axis 90. Alternatively, secondary catch 75 can be moved to release the mating latch component 96 so the closure panel 6 can be opened. It is noted that features can include increased packaging in vertical direction. As a result of the catch feature 300, the hood 6 can be first moved by the actuator 103, during a first and second stage of activation, to a deployed position for providing pop up of hood 6 to provide active pedestrian protection against a pedestrian colliding with hood 6. Subsequently, the latch 10 allows a user to easy return the hood 6 to at least the secondary latch position whereby coupling lever 76 is allowed to reengage with catch connector 80 (e.g. see FIG. 7C, as a result of the catch body 84 being moved during movement of the hood 6 downwardly), under influence of a bias 79 urging coupling lever 76 in a counterclockwise direction such that blocking portion 88 (e.g. face 88) can engage with catch connector 80, and thereby allow user to operate vehicle 4 with the hood 6 now in a secured state by the latch 10. The user is thus not required to overcome the deployed and non-reversible state of the actuator 103 e.g. deployed piston 102 which may be difficult and dangerous to reset due to pressure build up for example to return the hood 6 to a non-deployed state. A further downward motion may allow pawl 40 to reengage with ratchet 24 to hold the striker 96 in the primary latch position.

Referring to FIGS. 4a,b, shown is an initial position of the latch 100 as the secondary catch lever 75 is held by the coupling lever 76 in its pivot point to provide the secondary latch position at ~30 mm. There can be a clearance (e.g. of ~10 mm) between the actuator piston 102 and mating latch component 96 as shown by example.

Referring to FIGS. 5a,b,c,d shown is an intermediate firing position, such that the piston 102 is partially deployed and the whole actuator support plate 68+actuator system 101 can be pushed down. The actuator support plate 68 can disengage the pawl 40 and the coupling lever 76. At this point catch feature 300 can block the actuator support plate 68 to inhibit any travel further down along the axis 90.

Referring to FIGS. 6*a,b,c,d* shown is a full travel firing position, such that the hood 6 is pushed by the piston 102 in the vertical axis 90 direction. The secondary catch 75 can be pushed together with the mating latch component 96 until the actuator support plate 68 will hard stop in the support slot 71. For example, the actuator system 101 may not have a venting hole and the actuator system 101 pressure can hold the hood 6 in the deployed position (also referred to as the secondary latched position of the latch 100), once fired. Referring to FIGS. 7*a,b,c,d* shown is a return of the secondary catch 75 to the initial position, such that by pulling an inside handle 400 to move catch 302 in order to disengage from support connector 69 e.g. by moving blocking member 300 in order to decouple the actuator support plate 68 from the mounting plate 70 and will let the support plate 68 fall back in the support slot(s) 71 away from the closure panel 6. Extra space, as indicated adjacent to the latch assembly 10, can be used to accommodate the push back of the support plate 68. Alternatively, the coupling lever 76 can be moved (e.g. in cooperation with the release lever 50) in order to disengage from the blocking member 300 in order to decouple the actuator support plate 68 from the mounting plate 70 and can let the support plate 68 fall back in the support slot(s) 71 away from the closure panel 6.

Figure 10:
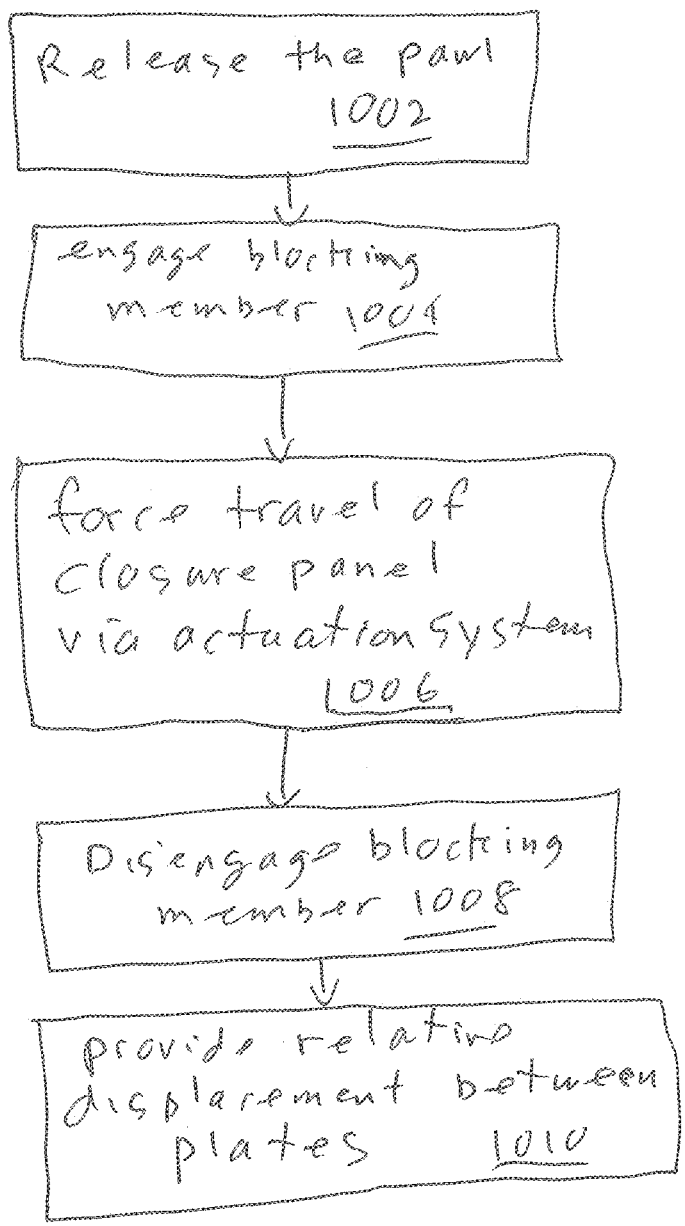
FIG. 10 shows a method of operation of the latch assembly of FIG. 3.

Referring to FIG. 10, shown is a method 1000 of operation of the latch assembly 10. The first step 1002 is releasing the pawl 40 from engagement with the ratchet 24. The next step 1004 is limiting relative displacement between the support plate 68 and the mounting plate 70 by engaging a blocking member e.g. catch feature 300 (e.g. between support plate 68 and the mounting plate 70. The next step 1003 is disengaging the secondary catch 75, if provided, during relative displacement between the support plate 68 and the mounting plate 70. Steps 1002, 1003, and 1004 can be performed during the first stage of actuation of the actuation system 101. Next step 1006 is where the actuation system 101 forces the closure panel 6 away (as the pop up travel POP) from the latch 100 (e.g. via contact and pushing using the piston 102 against one of the closure panel portion 6*a* and/or the mating latch component 96). During step 1006, it is recognized that the secondary catch 75 is engaged with the mating latch component 96 in order to place the latch 100 in the secondary latched position. The secondary latched position coincides with the deployed position of the actuation system 101 resulting in positioning of the closure panel 6 away from the latch 100 by the pop up travel distance POP (see FIGS. 6*a,b*). Step 1008 is where once the closure panel reaches the pop up position as defined by the pop up distance POP, the catch feature 300 can be disengaged (e.g destructive disengagement or non-destructive disengagement) in order to allow for the relative displacement T (see FIGS. 7*a,b*) at step 1010 between the mounting plate 70 and the support plate 68. This disengagement of the blocking member e.g. catch feature 300 can be caused by operation of a release lever (e.g. 306), or inside release handle 400, for example, or by the application of a Force F to the closure panel 6. It is recognized that other release mechanism of the catch feature 300 can be envisioned, as desired.

We claim:

1. A latch assembly (10) for providing travel (POP) of a closure panel (6) of a vehicle (4) away from a latch (100) during a collision event, the latch assembly compromising:
 a mounting plate (70) of the latch 100 for mounting a set of latch components (110) thereon including a ratchet (24) coupled to a pawl (40) for retaining and releasing a mating latch component (96) with respect to a slot (114) of the latch (100), the mating latch component mounted to the closure panel, the mounting plate connected to a body (5) of the vehicle;
 a support plate (68) coupled to the mounting plate by a support connector (69), the support connector providing a sliding connection between the support plate and the mounting plate along an axis (90);
 a blocking member (300) mounted to one of the support plate and the mounting plate, such that engagement of the blocking member limits relative displacement between the support plate and the mounting plate along the axis;
 an actuation system (101) mounted on the support plate, the actuation system for moving by the travel the closure panel between a primary latched position and a secondary latched position during actuation of the actuation system;
 wherein disengagement of the blocking member subsequent to said actuation of the actuation system provides for said relative displacement between the support plate and the mounting plate along the axis opposite to the direction of the travel of the closure panel.

2. The latch assembly of claim 1 further comprising a support slot (71) having a first end (71*a*) and a second end (71*b*) such that the support connector travels in the support slot from the second end to the first end during said relative displacement, the first end closer to the closure panel than the second end.

3. The latch assembly of claim 1, wherein the actuation system has a piston (102) for forcing at least one of the mating latch component and a closure panel portion (6*a*) away from the mounting plate for effecting the travel during the collision event.

4. The latch assembly of claim 1, the latch components further including a secondary catch (75) and a catch body (84) of the secondary catch, the catch body having a catch slot (86) having a first catch end (86*a*) and a second catch end (86*b*), the first catch end closer to the closure panel than the second catch end, the secondary catch slidingly connected via a catch connector (80) in the catch slot to either the support plate or the mounting plate.

5. The latch assembly of claim 4, wherein during said actuation the catch connector travels in the catch slot from the first catch end towards the second catch end.

6. The latch assembly of claim 1, wherein the blocking member is configured to engage with the support connector to provide said limits relative displacement.

7. The latch assembly of claim 1, wherein the blocking member is destructible to provide for said relative displacement.

8. The latch assembly of claim 4, further comprising a coupling lever mounted to the catch body in cooperation with a decoupling member (126) mounted to one of the support plate or the mounting plate, such that engagement between the decoupling member and the coupling lever provides for disengagement of the catch body from either the support plate or the mounting plate to provide for said travel during said actuation.

9. The latch assembly of claim 1, wherein the support plate moves in a direction opposite to said travel in a first stage of said actuation in order to disengage the pawl from the ratchet via a movement P of the pawl.

10. The latch assembly of claim 1, wherein the movement of the support connector during a first stage of said actuation engages the support connector with the blocking member in order to effect said limits relative displacement.

11. The latch assembly of claim 6, further comprising a catch mounted to one of the support plate or the mounting plate and configured to engage with the support connector to provide said limits relative displacement.

12. The latch assembly of claim 4, further comprising a coupling lever mounted to one of the support plate or the mounting plate in cooperation with a decoupling member mounted to the catch body, such that engagement between the decoupling member and the coupling lever provides for disengagement of the coupling lever from the secondary catch to provide for said travels of the catch connector during said actuation.

13. The latch assembly of claim 1 further comprising a coupling lever pivotally connected to one of the support plate, a catch body, or the mounting plate by a lever connector 82, the coupling lever pivoted about the lever connector via contact with a decoupling member mounted on the other of the support plate, the catch body or the mounting plate.

14. The latch assembly of claim 13, wherein said actuation causes said contact with the decoupling member.

15. The latch assembly of claim 14, wherein said contact is a result of an initial relative displacement between the support plate and the mounting plate.

16. The latch assembly of claim 3, wherein the piston remains extended from a cylinder of the actuation system during said relative displacement.

17. The latch assembly of claim 16, wherein a post deployment position of the support plate after said relative displacement is further away from the closure panel than a rest position of the support plate prior to said actuation.

18. A method of operating a latch assembly for providing travel of a closure panel of a vehicle away from a latch during a collision event, latch moving between a primary latched position and a secondary latched position, latch assembly having a latch mounted on a mounting plate including a ratchet and a pawl for retaining in the primary latched position a mating latch component connected to the closure panel, the latch assembly also having an actuation system mounted on a support plate, the support plate coupled to the mounting plate, the method compromising the steps of:

releasing the pawl from engagement with the ratchet when in the primary latched position;

limiting relative displacement between the support plate and the mounting plate by engaging a blocking member there between;

forcing the closure panel away from the latch by actuation of the actuation system in order to place the latch in the secondary latched position, the secondary latched position coinciding with a deployed position of the actuation system resulting in positioning of the closure panel away from the latch by said travel;

disengaging the blocking member in order to provide the relative displacement; and moving the support plate by said relative displacement with respect to the mounting plate opposite to the direction of said travel in order to return the closure panel towards the latch.

19. The method of claim 18, wherein the actuation system has a piston for forcing at least one of the matching latch component and a closure panel portion away from the mounting plate for effecting the travel during the collision event.

20. The method of claim 18, wherein the blocking member is destroyed during moving the support plate by said relative displacement with respect to the mounting plate opposite to the direction of said travel in order to return the closure panel towards the latch.

* * * * *